United States Patent
Black

(10) Patent No.: US 10,182,135 B2
(45) Date of Patent: Jan. 15, 2019

(54) WIRELESS COMMUNICATION SYSTEM FOR USE BY TEAMS

(71) Applicant: Bruce Black, Hamilton (CA)

(72) Inventor: Bruce Black, Hamilton (CA)

(*) Notice: Subject to any disclaimer, the term of this patent is extended or adjusted under 35 U.S.C. 154(b) by 21 days.

(21) Appl. No.: 15/336,243

(22) Filed: Oct. 27, 2016

(65) Prior Publication Data

US 2017/0099375 A1    Apr. 6, 2017

Related U.S. Application Data

(60) Division of application No. 14/751,711, filed on Jun. 26, 2015, now Pat. No. 9,485,573, which is a
(Continued)

(51) Int. Cl.
*H04M 1/03* (2006.01)
*H04R 1/02* (2006.01)
(Continued)

(52) U.S. Cl.
CPC ............ *H04M 1/03* (2013.01); *A41D 27/201* (2013.01); *A41D 27/205* (2013.01); *A42B 3/303* (2013.01); *H04R 1/028* (2013.01); *H04R 1/1025* (2013.01); *H04R 1/1041* (2013.01); *H04R 1/2876* (2013.01); *H04R 3/005* (2013.01); *H04R 3/12* (2013.01); *H04R 5/033* (2013.01); *H04S 7/00* (2013.01); *H04W 52/0241* (2013.01); *H04W 84/08* (2013.01); *A41D 2300/32* (2013.01); *H04R 2201/023* (2013.01);
(Continued)

(58) Field of Classification Search
CPC ............ H04B 1/385; H04B 2001/3866; H04B 2001/3855; H04B 1/44; H04B 5/06; H04B 1/086; H04B 1/3822; H04B 1/3833; H04B 1/3877; H04B 1/3888; A42B 3/30; A42B 3/0433; A42B 3/046; A42B 3/127; A42B 1/245; A42B 3/0406; A42B 3/0493; A42B 3/16; A42B 3/281; H04R 5/033; H04R 2201/023; H04R 2201/107; H04R 1/1008; H04R 1/028; H04R 1/1083; H04R 5/0335; H04R 1/1025; H04R 1/1033; H04R 1/1041; H04R 1/1066; H04R 2410/05; H04R 2420/07; H04M 1/05; H04M 1/7253; H04M 3/56; H04M 1/6058; H04M 1/6066; H04M 1/6091; H04M 1/656; H04M 1/72527; H04M 2207/18
See application file for complete search history.

(56) References Cited

U.S. PATENT DOCUMENTS 5,404,577 A * 4/1995 Zuckerman .............. A42B 3/30
455/351
5,563,951 A   10/1996 Wang
(Continued)

FOREIGN PATENT DOCUMENTS

WO    WO2006004796    *  1/2006  ............ H04R 25/00

*Primary Examiner* — Golam Sorowar
(74) *Attorney, Agent, or Firm* — Bereskin & Parr LLP

(57) ABSTRACT

A helmet mounted communication system for use by teams includes a headset including any one of a speaker for projecting audio or a microphone for receiving audio, a mounting structure for mounting the headset in a helmet cavity of a helmet, and a biasing material between the headset and a cavity wall of the helmet cavity for floatably attaching the headset to the helmet in the helmet cavity.

20 Claims, 28 Drawing Sheets

Related U.S. Application Data continuation-in-part of application No. 13/593,642, filed on Aug. 24, 2012, now Pat. No. 9,071,901.

(51) Int. Cl.

| | | |
|---|---|---|
| *H04R 1/10* | (2006.01) | |
| *H04R 5/033* | (2006.01) | |
| *H04W 84/08* | (2009.01) | |
| *H04W 52/02* | (2009.01) | |
| *H04R 3/00* | (2006.01) | |
| *H04R 3/12* | (2006.01) | |
| *H04S 7/00* | (2006.01) | |
| *A41D 27/20* | (2006.01) | |
| *A42B 3/30* | (2006.01) | |
| *H04R 1/28* | (2006.01) | |

(52) U.S. Cl.
CPC .... *H04R 2201/107* (2013.01); *H04R 2420/07* (2013.01); *H04S 2420/01* (2013.01); *Y02D 70/00* (2018.01); *Y02D 70/142* (2018.01); *Y02D 70/144* (2018.01); *Y02D 70/166* (2018.01); *Y02D 70/26* (2018.01)

(56) References Cited

U.S. PATENT DOCUMENTS

| | | |
|---|---|---|
| 5,987,024 A | 11/1999 | Duch |
| 6,032,051 A | 2/2000 | Hall et al. |
| 6,356,773 B1* | 3/2002 | Rinot .................. H01Q 1/245 2/171 |
| 6,652,284 B2 | 11/2003 | August et al. |
| 7,270,255 B2 | 9/2007 | Badillo |
| 7,660,263 B1 | 2/2010 | Pfister |
| 2004/0244098 A1* | 12/2004 | Sumitomo ............. A42B 3/281 2/410 |
| 2005/0049080 A1 | 3/2005 | Hovington |
| 2005/0096096 A1* | 5/2005 | Birli ...................... H04B 1/385 455/569.1 |
| 2005/0135297 A1* | 6/2005 | Katayama ........... H04M 1/6066 370/328 |
| 2005/0170791 A1 | 8/2005 | Tabata et al. |
| 2005/0170870 A1 | 8/2005 | Goldenberg et al. |
| 2005/0212202 A1 | 9/2005 | Meyer |
| 2007/0019399 A1* | 1/2007 | Harris .................. A42B 3/0406 362/106 |
| 2007/0111754 A1 | 5/2007 | Marshall et al. |
| 2008/0085679 A1* | 4/2008 | Fettig ....................... H04B 5/06 455/41.2 |
| 2008/0096600 A1 | 4/2008 | Siegel |
| 2008/0153557 A1 | 6/2008 | Matveev |
| 2009/0052714 A1 | 2/2009 | Wilbur |
| 2010/0077536 A1 | 4/2010 | Daniel et al. |
| 2010/0080389 A1 | 4/2010 | Daniel et al. |
| 2010/0086152 A1 | 4/2010 | Rank et al. |
| 2010/0206976 A1 | 8/2010 | Salentine et al. |
| 2011/0269506 A1 | 11/2011 | Choi |
| 2011/0286620 A1* | 11/2011 | Flynn ..................... A42B 1/245 381/375 |
| 2014/0003646 A1* | 1/2014 | Andersen ................ H04R 1/08 381/375 |
| 2014/0159922 A1* | 6/2014 | Maliszewski .......... A42B 3/046 340/870.16 |
| 2015/0080061 A1* | 3/2015 | Dieringer ............ H04M 1/6066 455/569.1 |

* cited by examiner

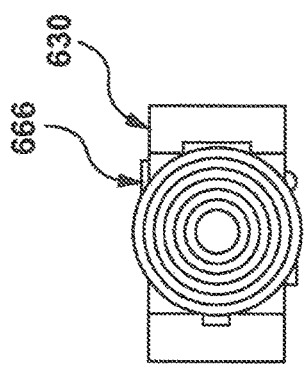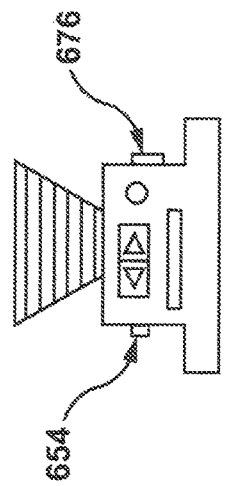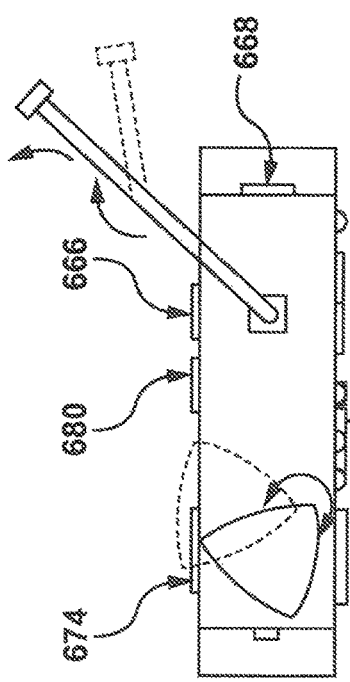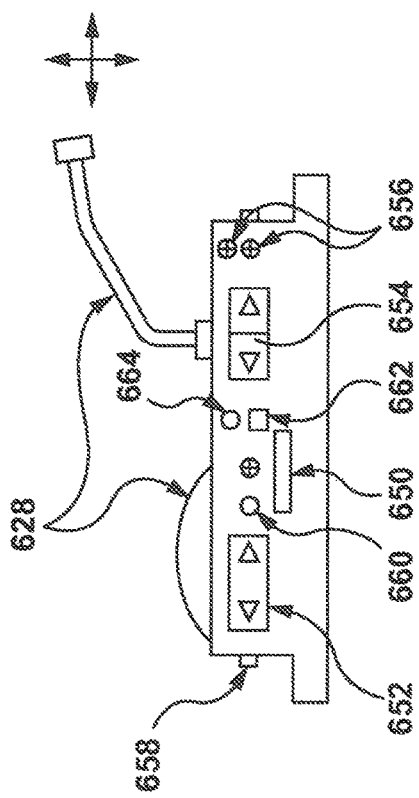

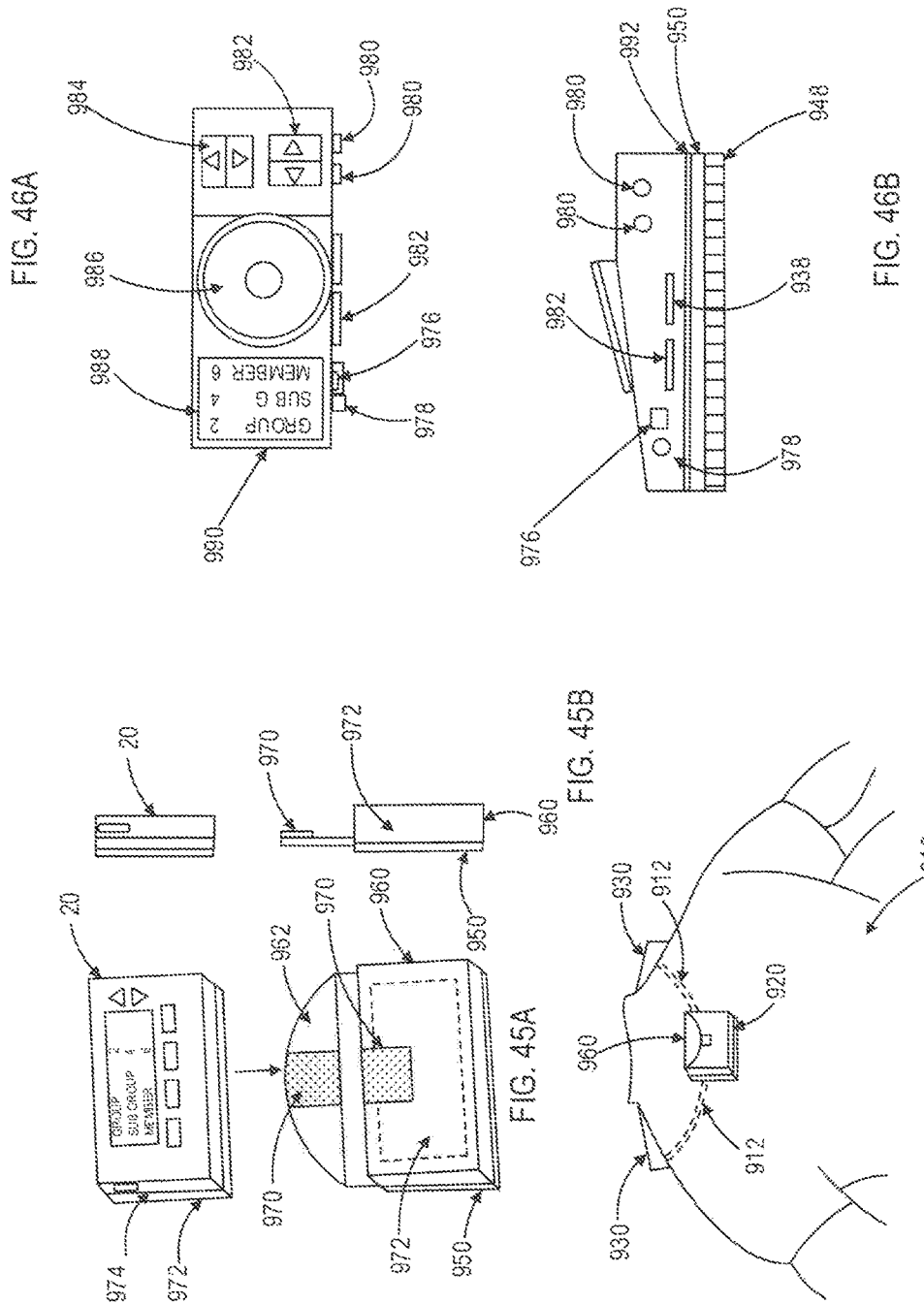

WIRELESS COMMUNICATION SYSTEM FOR USE BY TEAMS

RELATED APPLICATIONS

This application is a divisional of U.S. patent application Ser. No. 14/751,711, filed Jun. 26, 2015 entitled "WIRELESS COMMUNICATION SYSTEM FOR USE BY TEAMS", which is a continuation-in-part of U.S. patent application Ser. No. 13/593,642, filed Aug. 24, 2012 and entitled "WIRELESS COMMUNICATION SYSTEM FOR USE BY TEAMS", which claims priority to Canadian Patent Application No. 2,750,509, filed on Aug. 26, 2011 and entitled "WIRELESS COMMUNICATION SYSTEM FOR USE BY TEAMS", the entire contents of which are hereby incorporated by reference herein for all purposes.

TECHNICAL FIELD

The invention relates to wireless communication systems, and in particular to wireless communication systems for use by teams such as sports teams.

BACKGROUND

When working together as a team, it is generally desirable for team members to communicate with each other. For example, when playing team sports, it is desirable for teammates, coaches and other individuals to communicate with each other. However, these individuals may be physically separated by distances that do not allow face-to-face conversations.

Some communication systems have been developed to allow communication between team members playing team sports. For example, U.S. Patent Application Publication Number 2005/0212202 (Meyer) discloses a communication system for providing instruction, information, and verbal commands between a sports coach and a player. The system comprises a microphone and a transmitter for the coach, and a receiver and a speaker for each player. When the coach desires to talk to players, he activates the microphone and speaks into it. According to Meyer, the system can wirelessly transmit the coach's voice to the players despite physical separation therebetween.

One problem with the wireless communication system of Meyer is that the wireless electronics tend to be high power devices, for example, those associated with radio frequencies such as AM, FM, citizen's band, and family radio frequencies. These high power devices can represent unacceptable safety risks for users, and particularly for children, when the electronics are mounted close to the user's head. While it might be possible to use some low power devices, these low power devices typically have a limited range which can interrupt communication between individuals over long distances.

Another problem is that it can be difficult for players to selectively communicate with other individuals while playing the sport. While Meyer discloses the possibility of providing the player receiver with an optional microphone and transmitter for two-way communication, there is no way for players to send transmissions only at certain times, or to certain players.

In view of the above system, there is a need for an improved communication system for use in team sports.

SUMMARY OF THE INVENTION

According to one aspect of the invention, there is a wireless communication system for use by members of a team. The wireless communication system comprises a first wireless communication device for a first team member, and a second wireless communication device for a second team member. The first wireless communication device comprises a microphone for enabling the first team member to input an oral message, and a transmitter for transmitting the oral message via a first wireless communication protocol. The second wireless communication device comprises a main transceiver, a wearable audio device, and a support for mounting the main transceiver to the second team member in a location physically remote from the wearable audio device. The main transceiver receives the oral message from the first wireless communication device via the first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the second team member such that the second team member is able to hear ambient sound in addition to the oral message. The second wireless communication protocol operates at a lower power than the first wireless communication protocol, and the first communication protocol operates over a longer range than second wireless communication protocol.

In some embodiments the wearable audio device of the second wireless communication device may comprise a transmitter and a microphone in communication with the transmitter for enabling the second team member to send an outgoing oral message to the main transceiver via the second communication protocol. The main transceiver may be configured to retransmit the outgoing oral message to another wireless communication device via the first wireless communication protocol.

In some embodiments the second wireless communication device may further comprise a stick trigger mountable to a hockey stick. The stick trigger may be in communication with the main transceiver such that actuating the stick trigger enables transmission of the outgoing oral message.

In some embodiments the wearable audio device may be a headset mountable to a helmet. In some embodiments the wearable audio device may comprise epaulet speakers.

In some embodiments the second wireless communication protocol may operate at a power of less than about 3-milliwatts. In some embodiments the second wireless communication protocol may operate over a maximum range of less than about 10-meters.

In some embodiments the first communication protocol may operate over a range of at least about 50 meters. In some embodiments the first wireless communication protocol may operate at a minimum power of at least about 50-milliwatts.

According to another aspect of the present invention, there is a wireless communication system for use by members of a team. The wireless communication system comprises a first wireless communication device for a team leader and a plurality of second wireless communication devices, each of the second wireless communication devices being usable by a respective team member. The first wireless communication device comprises a microphone for enabling the team leader to input an oral message, and a transmitter for transmitting the oral message via a first wireless communication protocol. Each of the second wireless communication devices comprises a main transceiver, a wearable audio device, and a support for mounting the main transceiver to the respective team member in a location physically remote from the wearable audio device. The main transceiver receives the oral message from the first wireless communication device via the first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the respective team member such that the respective team member is able to hear ambient sound in addition to the oral message. The second wireless communication protocol operates at a lower power than the first wireless communication protocol, and the first communication protocol operates over a longer range than second wireless communication protocol. The first wireless communication device also comprises a group routing controller for selectively transmitting the oral message to at least one of the second wireless communication devices.

In some embodiments the group routing controller may include a group selection actuator for selectively transmitting the oral message to at least one group of the second wireless communication devices. In some embodiments the group routing controller may include a plurality of group selection actuators for selectively transmitting the oral message to a plurality of groups of the second wireless communication devices.

In some embodiments, the wireless communication system may include at least one scanner for detecting team members within a detection area. Furthermore, the first wireless communication device may transmit the oral message to team members located outside the detection area and not team members located within the detection area.

According to another aspect of the present invention, there is a wireless communication device for use by a team member. The wireless communication device comprises a main transceiver, a wearable audio device, and a support for mounting the main transceiver to the team member in a location physically remote from the wearable audio device. The main transceiver receives an incoming oral message from another wireless communication device via a first wireless communication protocol and retransmits the oral message via a second wireless communication protocol. The wearable audio device comprises a receiver for receiving the oral message from the main transceiver via the second wireless communication protocol, and at least one speaker in communication with the receiver for generating audio corresponding to the oral message. The speaker is mounted to the wearable audio device so as to be spaced apart from an ear of the team member such that the team member can hear ambient sounds in addition to the oral message. The second wireless communication protocol operates at a lower power than the first wireless communication protocol, and the first communication protocol operates over a longer range than second wireless communication protocol.

In some embodiments the wearable audio device may comprise a transmitter and a microphone in communication with the transmitter for enabling the team member to send an outgoing oral message to the main transceiver via the second communication protocol. The main transceiver may be configured to retransmit the outgoing oral message to at least one other wireless communication device via the first wireless communication protocol.

In some embodiments the wireless communication device may further comprise a stick trigger mountable to a hockey stick. The stick trigger may be in communication with the main transceiver such that actuating the stick trigger enables transmission of the outgoing oral message.

In some embodiments the support may comprise a containment receptacle for receiving the main transceiver, a mounting plate for supporting the containment receptacle on clothing worn by the team member, a first fastener for mounting the containment receptacle to the mounting plate, and a second fastener for mounting the containment receptacle to the mounting plate.

According to another aspect of the present invention, there is a helmet mounted communication system. The helmet mounted communication system includes a headset including any one of a speaker for projecting audio or a microphone for receiving audio. The helmet mounted communication system also includes a mounting structure for mounting the headset in a helmet cavity of a helmet and a biasing material between the headset and a cavity wall of the helmet cavity for floatably attaching the headset to the helmet in the helmet cavity.

In some embodiments the headset includes an antenna for receiving or transmitting audio signals and the antenna protrudes through an opening in the helmet.

In some embodiments the mounting structure includes a slide cap cover for overlapping the headset to hold the headset in the helmet cavity, at least one fastener for attaching the slide cap cover to the helmet, and a cap shielding plate on the helmet for mating with the slide cap cover and the fastener and for cushioning the headset with respect to the helmet.

In some embodiments the biasing material is a resilient foam or a spring that inhibits the transmission of an impact to the headset.

In some embodiments the helmet mounted communication system further includes a containment shield for containing the headset when destroyed.

In some embodiments the helmet mounted communication system is retrofitted into an existing helmet.

In some embodiments the helmet cavity wall has a drain hole to allow moisture to exit the helmet cavity.

In some embodiments the helmet mounted communication system includes a recharge port for providing power to the headset.

In some embodiments the helmet mounted communication system includes a transceiver.

In some embodiments the headset includes a transceiver.

In some embodiments the transceiver is immobilized in a shoulder pad mounted transceiver.

According to another aspect of the present invention, there is a wireless communication system includes a first wireless communication device for a first team member and a second wireless communication device for a second team member. The first wireless communication device has a microphone for enabling the first team member to input an oral message and a transmitter for transmitting the oral message via a first wireless communication protocol. The second wireless communication device has a main transceiver for receiving the oral message from the first wireless communication device via the first wireless communication protocol and for retransmitting the oral message via a second wireless communication protocol, a wearable audio device having a receiver for receiving the oral message from the main transceiver via the second wireless communication protocol, and at least one speaker in communication with the receiver for generating audio corresponding to the oral message, the speaker is mounted to the wearable audio device so as to be spaced apart from an ear of the second team member such that the second team member is able to hear ambient sound in addition to the oral message, and a support on the second team member for mounting the main transceiver onto the second team member, the support in a location physically remote from the wearable audio device. The second wireless communication protocol operates at a lower power than the first wireless communication protocol and the first communication protocol operates over a longer range than second wireless communication protocol.

In some embodiments the wearable audio device of the second wireless communication device includes a transmitter and a microphone in communication with the transmitter for enabling the second team member to send an outgoing oral message to the main transceiver via the second communication protocol. The main transceiver is configured to retransmit the outgoing oral message to another wireless communication device via the first wireless communication protocol.

In some embodiments the second wearable audio device includes an epaulet speaker that is mounted and immobilized in an epaulet of a jersey.

In some embodiments the epaulet speaker is angled towards an ear of the second team member.

In some embodiments the first wireless communication device includes a controller having one or more selection actuators for selectively transmitting the oral message.

In some embodiments the first wireless communication device includes a proximity sensor configured to detect team members within a detection area wherein, when the team member is within the detection area, the second wireless communication device enters a standby mode.

In some embodiments the first wireless communication device includes a transceiver for transmitting an oral message to one or more wireless communication devices.

In some embodiments the first wireless communication device includes a plurality of pre-set signal bandwidth settings including a plurality of groups and a plurality of sub-groups.

In some embodiments the first wireless communication device includes an alarm module for generating a selected alarm notice at a determined time and broadcasting the selected alarm notice to a selected sub-group.

Other aspects and features of the invention will become apparent, to those ordinarily skilled in the art, upon review of the following description of some exemplary embodiments.

BRIEF DESCRIPTION OF THE DRAWINGS

The invention will now be described, by way of example only, with reference to the following drawings, in which:

FIGS. 32A and 32B are top and side views of a transceiver, speaker, and boom style microphone headset; in accordance with an embodiment;

FIGS. 33A and 33B are top and side views of a passive jaw bone microphone headset, in accordance with an embodiment;

FIGS. 45A and 45B are rear and side exploded views of an epaulet system, in accordance with an embodiment;

FIG. 45C is a rear in-use view of the epaulet system of FIG. 45A;

FIGS. 46A and 46B are top and side views of an epaulet transceiver, in accordance with an embodiment;

DETAILED DESCRIPTION OF THE INVENTION

Figure 1:
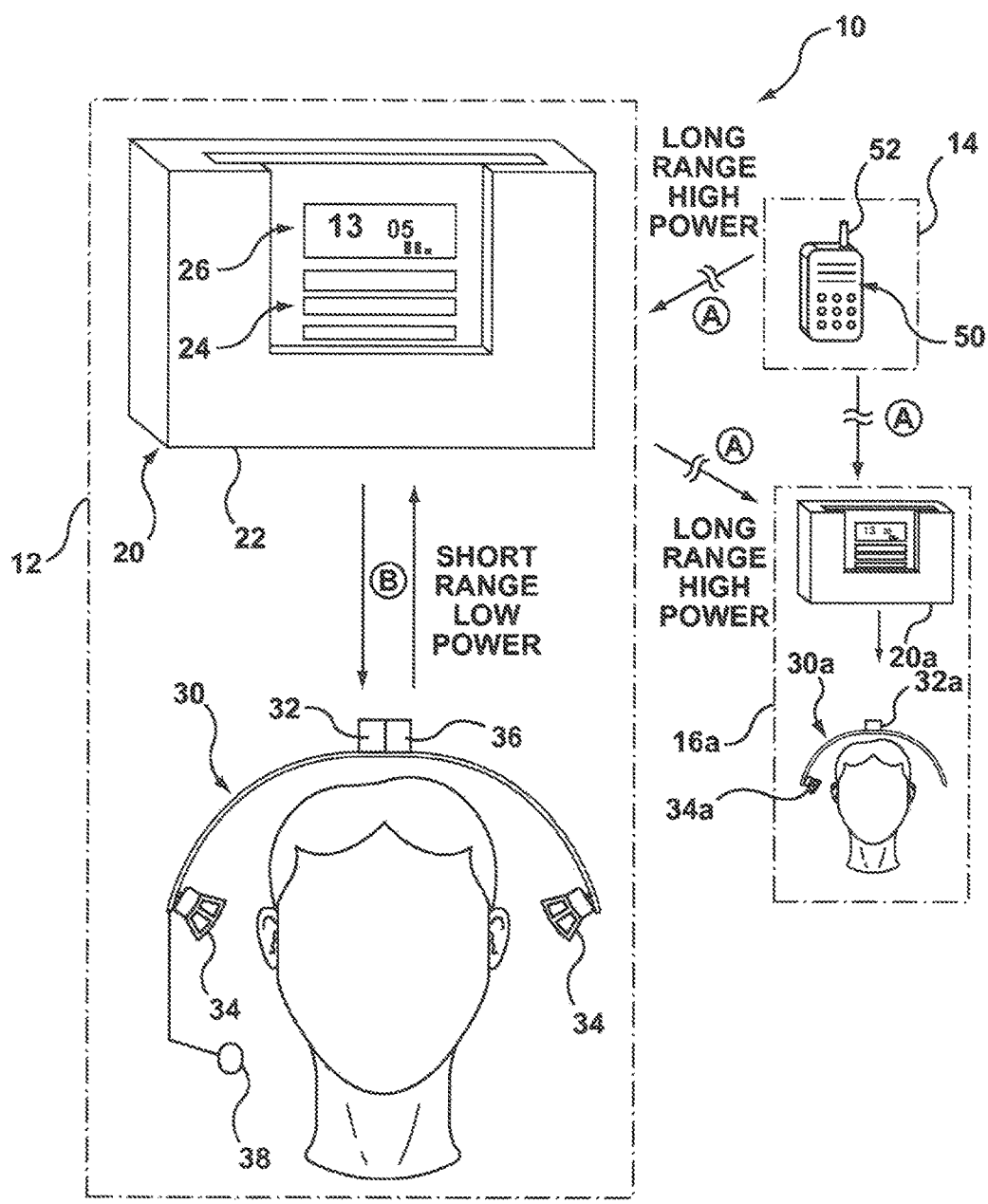
FIG. 1 is a schematic diagram of a wireless communication system comprising a plurality of wireless devices for use by a team such as a hockey team according to an embodiment of the present invention.

Referring to FIG. 1, illustrated therein is a wireless communication system 10 for use by teams including sports teams such as hockey, football, and soccer teams. The system includes a plurality of wireless communication devices 12, 14, and 16 that are in wireless communication with each other for transmitting oral messages between team members, such as players, coaches, game officials, spectators and the like. The wireless communication devices 12, 14, and 16 may provide one-way oral communication between a team leader and another team member, or may provide two-way oral communication between team members as will be described below.

As shown, one of the wireless communication devices 12 includes a main transceiver 20 and a wearable audio device such as a headset 30. The headset 30 includes a receiver 32 in wireless communication with the main transceiver 20, and one or more speakers 34 in communication with the receiver 32.

Generally, the main transceiver 20 receives an incoming oral message from another wireless communication device (e.g. one of the wireless communication devices 14 or 16) via a first wireless communication protocol (identified by reference numeral "A" in FIG. 1) and retransmits the oral message to the receiver 32 via a second wireless communication protocol (identified by reference numeral "B" in FIG. 1). The speakers 34 then generate audio corresponding to the oral message.

Figure 2:
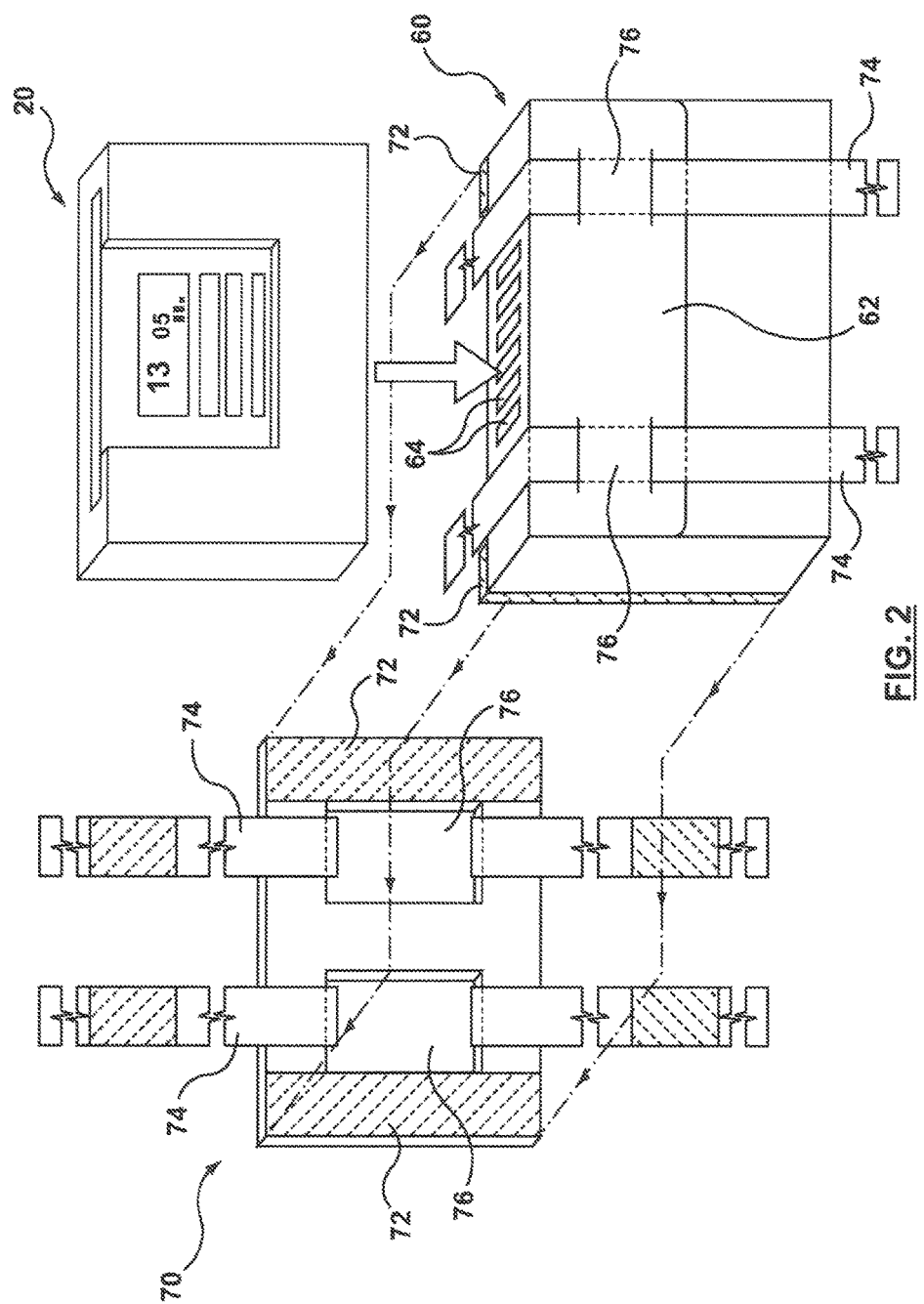
FIG. 2 is a perspective view of a mounting plate and a containment pouch for mounting a main transceiver of one of the wireless units of FIG. 1 to clothing worn by a team member.

The main transceiver 20 is generally mounted to the team member using a support (e.g. mounting plate 70 and a containment receptacle 60 as shown in FIG. 2), which may be attached to clothing such as sporting equipment used by the team member. The support generally positions the main transceiver in a location physically remote from the headset 30. For example, the main transceiver 20 may be mounted to shoulder pads, hockey pants, sports clothing (such as clothing made by Under Armour™), other types of sporting equipment or other types of clothing.

The main transceiver 20 includes an enclosure 22, which may be made from a durable and light material such as a polymer. The main transceiver 20 and the enclosure 22 may have a slim profile, which allows the main transceiver 20 to be attached to sporting equipment while minimizing interference with the functionality, safety or comfort provided by the sporting equipment.

As shown, the headset 30 is generally worn on the team member's head, and may be mounted to headgear worn by the team member, such as a hockey helmet, a football helmet, headband, and the like. The headset 30 may be installed on the headgear as an aftermarket accessory, or may be integrally manufactured as part of the headgear, as described, for example with respect to FIGS. 15-34.

The headset 30 is generally mounted to the headgear in a way that is electrically and physically shock resistant. Electrical components of the headset 30 may also be contained so as to provide water resistance. The components of the headset 30 may also have a low profile so as to minimize interference with functionality, safety or comfort provided by the headgear.

The speakers 34 are generally mounted to the headset 30 such that the team member can hear ambient sounds in addition to incoming oral messages. For example, the speakers 34 may be mounted to the headset 30 so as to be spaced apart from the ears of the team member. The space between the speakers 34 and the ears enables sound waves from an ambient source to reach the team member's ear canal, which may permit the team member to hear ambient sounds. This may be particularly beneficial to certain team members (such as players or game officials in a team sport) because these individuals might need to hear gameplay sounds in addition to incoming oral messages.

As indicated above, the main transceiver 20 of the wireless communication device 12 receives incoming oral messages via the first wireless communication protocol A and retransmits the oral message to the receiver 32 of the headset 30 via the second wireless communication protocol B. The first communication protocol A generally operates over a long range and at a high power for transmission between the wireless communication devices 12, 14 and 16. In contrast, the second communication protocol B operates over a short range and at a low power for transmission between the main transceiver 20 and respective headset 30. For example, the second wireless communication protocol B may operate at a power of less than about 3-milliwatts (such as Bluetooth™ class 2 or class 3), whereas the first communication protocol A may operate at a higher power, for example, of up to about 500-milliwatts (such as FRS Radio) or up to about 5-watts (such as GMRS Radio).

Operating the second wireless communication protocol B at a low power tends to reduce the range of the communication system 10. For example, Bluetooth™ class 2 or class 3 devices typically have a limited range of up to about 10 meters, which is generally not sufficient for communication between players, coaches and other team members that are physically separated from each other during team sports such as hockey, football, soccer, and the like. In order to provide sufficient range, the first communication protocol A operates over a longer range than second wireless communication protocol B. For example, the first communication protocol may operate over a range of at least about 50 meters, or more preferably, a range of at least about 500 meters such as FRS Radio or GMRS Radio.

The use of two wireless communication protocols A and B allows long range communication between team members, while also maintaining user safety because the components in the headset 30 can operate at a low power that represents a negligible or reduced safety risk to users. This can be particularly beneficial to communication systems for use in team sports because the wireless electronics are located in close proximity to the user's head, and may be subject to impacts that could damage the electronics and expose the user to electrical hazards. At the same time, players, coaches, game officials, spectators and other team members in team sports can communicate with each other while separated by large distances.

While a few exemplary communication protocols have been described, other communication protocols may be utilized. For example, the second communication protocol may utilize Bluetooth class 1 or IEEE 802.11 (Wi-Fi) in conjunction with FRS or GMRS radios as the first communication protocol. As another example, the second communication protocol may utilize Bluetooth™ class 3 while the first communication protocol may utilize IEEE 802.11 (Wi-Fi).

In some embodiments, the main transceiver 20 may also include controls 24 for adjusting different parameters associated with the wireless communication device 12, such as volume, operating frequency/channel, encryption codes, hands-free operation, and power on/off. The main transceiver 20 may also include a display 26 for indicating various parameters such as wireless signal strength, volume, frequency/channel selection, encryption code (if any), hands-free on/off (if included), and power on/off.

As shown in the illustrated embodiment, the headset 30 may also include a transmitter 36 and a microphone 38 for enabling the team member to send an outgoing oral message to the main transceiver 20 via the second communication protocol B. The main transceiver 20 can then retransmit the outgoing oral message to another wireless communication device (e.g. the wireless communication device 16) via the first wireless communication protocol A. The combination of the transmitter 36 and microphone in addition to the receiver 32 and speakers 34 generally enables two-way communication between team members.

In some embodiments, the microphone 38 may be selected to reduce the amount of ambient noise being transmitted to other team members. For example, the microphone 38 may include controls for adjusting noise filtration and sensitivity.

The receiver 32 and the transmitter 36 may be integrated into a single transceiver unit mounted to the headset 30. In other embodiments, the receiver 32 and the transmitter 36 may be separate.

While the wireless communication device 12 is capable of providing two-way communication, in some embodiments, the communication system 10 may include other wireless communication devices that provide one-way communication. For example, the wireless communication device 14 may be configured to transmit one-way communications only. In particular, the wireless communication device 14 may include a microphone 50 for enabling a team member to input an oral message, and a transmitter 52 for transmitting the oral message via the first wireless communication A protocol to the wireless communication devices 12 or 16. The one-way wireless communication device 14 permits a team leader such as a coach to send oral messages to one or more team members, for example, to provide instruction or feedback on gameplay. It may be desirable to use one-way communication so as to reduce system costs, particularly when two-way communication is not required.

As another example, the wireless communication device 16 may be configured to receive one-way communications only. In particular, the wireless communication device 16 may include a main transceiver 20a, and a headset 30a that includes a receiver 32a and a single speaker 34a, but no microphone or transmitter.

While the communication system 10 shown in FIG. 1 includes three different wireless communication devices 12, 14 and 16, in some embodiments, the communication system 10 may include other numbers of wireless communication devices, which may be the same, similar or different than the wireless communication devices described.

Referring now to FIG. 2, illustrated therein is a support for mounting the main transceiver 20 to a team member in a location physically remote from the wearable audio device (e.g. the headset 30). The support includes a containment receptacle (e.g. a containment pouch 60) for receiving the main transceiver 20, a mounting plate 70 for supporting the containment pouch on clothing worn by the team member, and two fasteners (e.g. hook and loop fasteners 72 and straps 74) for mounting the containment pouch 60 to the mounting plate 70.

The containment pouch 60 generally has a pocket for receiving the main transceiver and a flap 62 that folds down to cover the pocket and retain the main transceiver within the pouch 60. The pouch 60 helps to contain the main transceiver 20, for example, in the event that an impact (e.g. caused by one player body checking another player) damages the main transceiver 20 and creates debris. The pouch 60 contains that debris and prevents the debris from contaminating the playing surface, which can be particularly beneficial when playing sports such as ice hockey. For example, it may be hazardous and there may be a physical risk of injury if a contaminant was to make its way to the ice surface.

The interior or exterior of the pouch may be lined with a soft compressible material such as light foam to reduce the risk of damage to the main transceiver 20 while also reducing the risk of injury to players that might come into contact with the pouch 60 containing the main transceiver 20.

The pouch 60 may also include vents 64 for providing air ventilation so as to cool the main transceiver 20, which may reduce the likelihood of overheating.

The mounting plate 70 generally mounts the containment pouch 60 to clothing worn by the team member such as sporting equipment including shoulder pads, hockey pants, or sports clothing (such as clothing made by Under Armour™). The mounting plate 70 generally has a slim design, which allows it to fit into sporting equipment without interfering with functionality, safety or comfort provided by the equipment. The mounting plate 70 may be manufactured integrally as part of the sporting equipment or may be supplied as an aftermarket accessory that can be attached to the sporting equipment, for example, by sewing the mounting plate 70 to the equipment. The mounting plate 70 may be made from a semi-rigid material such as a polymer and may be covered in a compressible material such as foam.

As shown in FIG. 2, the pouch 60 is mounted to the mounting plate 70 using a first fastener (e.g. a set of hook and loop fasteners 72 such as Velcro™) and a second fastener (e.g. mounting straps 74) for mounting the main transceiver 20 to the sporting equipment. Using two or more fasteners can provide redundancy, which may reduce the likelihood that the pouch will fall off or otherwise detach from the mounting plate 70.

As shown in FIG. 2, the back of the pouch 60 includes strips of hook and loop fasteners 72 that engage corresponding strips of hook and loop fasteners 72 on the mounting plate 70. Furthermore, the pouch 60 and the mounting plate 70 each have a plurality of slits or loop holes 76 for receiving the mounting straps 74. As shown, the slits 76 are oriented so that the straps 74 cross over the flap 62, which tends to help to keep the flap 62 closed so as to contain the main transceiver 20 within the pouch 60.

While the embodiment illustrated in FIG. 2 includes a containment pouch 60 and a mounting plate 70, the main transceiver 20 may be mounted to clothing using other types of supports, such as belt clips, fabric pockets in equipment or clothing, and the like.

Figure 3:
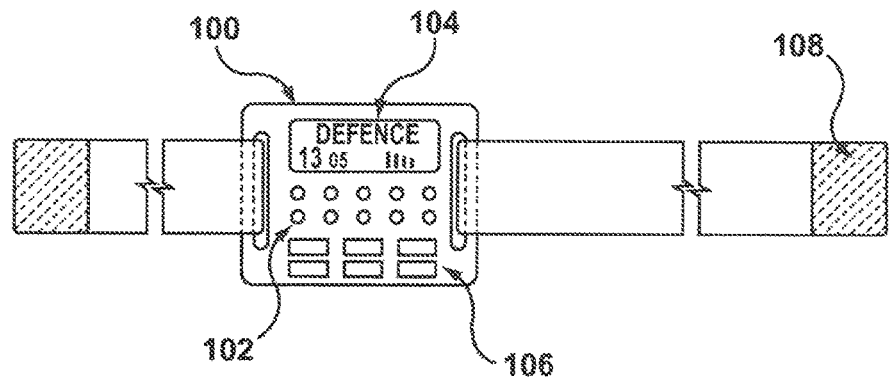
FIG. 3 is a front elevation view of a group routing controller for use with the wireless communication system of FIG. 1.

Referring now to FIG. 3, illustrated therein is a group routing controller 100 that can be used with one of the wireless communication devices 12 or 14 that are capable of transmitting oral messages to other wireless communication devices. The group routing controller 100 allows a team leader to selectively transmit oral messages to individual team members or groups of team members. The group routing controller 100 can be particularly useful for coaches, game officials and other team leaders who want to communicate with particular team members or groups of team members.

Figure 4A:
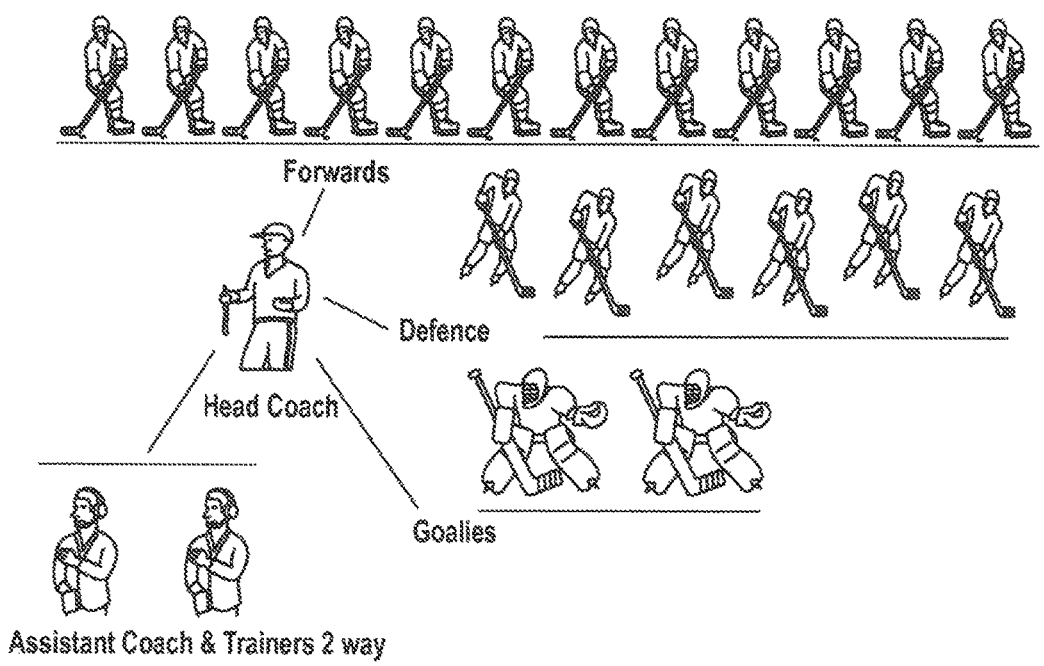
FIG. 4A is a schematic diagram of a hockey coach using the wireless communication system to communicate with team members including forwards, defences, goalies, and assistant coaches.
Figure 4B:
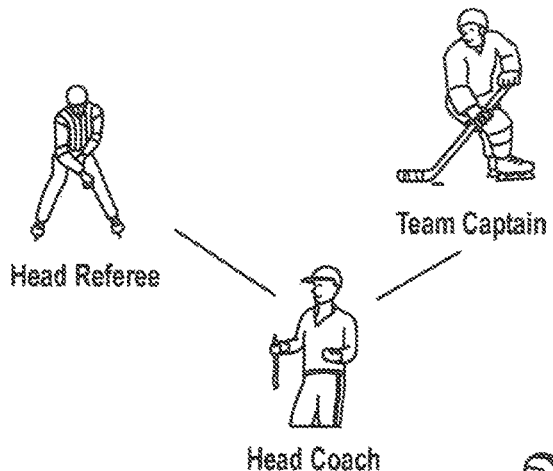
FIG. 4B is a schematic diagram of a hockey coach using the wireless communication system to communicate with team members including a team captain and a head referee.
Figure 4C:
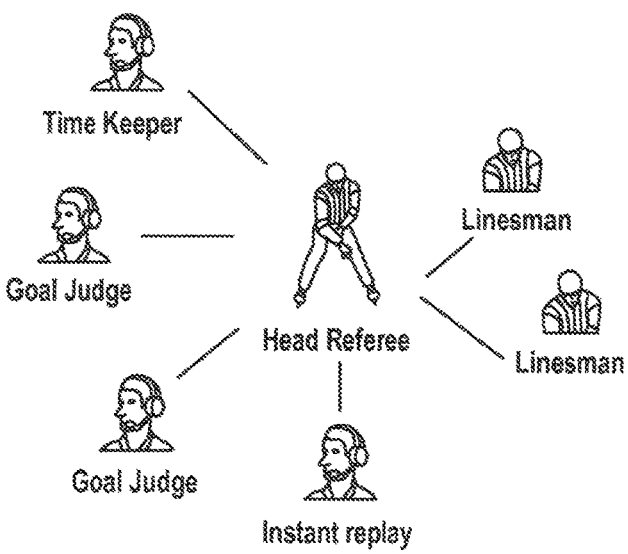
FIG. 4C is a schematic diagram of a head referee using the wireless communication system to communicate with team members including a time keeper, goal judges, instant replay officials, and linesmen.
Figure 4D:
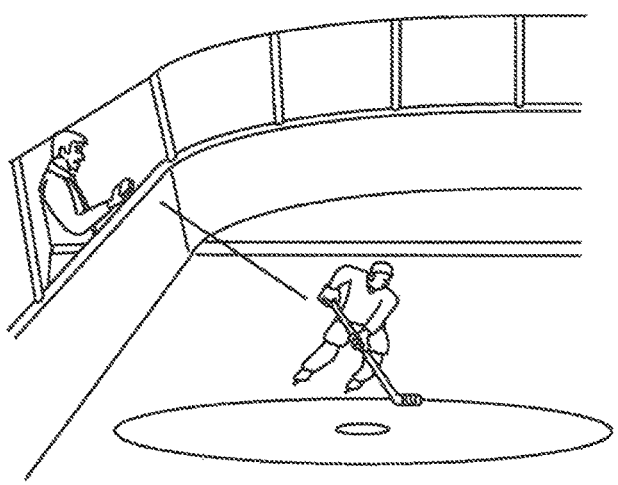
FIG. 4D is a schematic diagram of a spectator using the wireless communication system to communicate with a player.

The group routing controller 100 includes one or more selection actuators 102 (e.g. buttons) for selectively transmitting the oral message to a particular wireless communication device or group of wireless communication devices. As an example, the selection actuators 102 may include individual selection actuators, for example, corresponding to particular team members such as a team captain, head coach, head referee, and the like. The selection actuators 102 may also include group selection actuators that correspond to particular groups of team members. For example, referring to FIG. 4A, some selection actuators 102 might allow a head coach to communicate with entire teams, forward players, defensive players, goalies, and/or coaching staff (including assistant coaches, forward coaches, defensive coaches, goalie coaches, trainers, and other coaching staff). Referring to FIG. 4B, some selection actuators 102 might allow a head coach to communicate with a team captain or a head referee. Referring to FIG. 4C, some selection actuators 102 might allow a head referee to communicate with certain game officials including linesmen, goal judges, instant replay officials, time keepers, and/or other officials. Referring to FIG. 4D, some selection actuators 102 might allow a spectator to communicate with a particular player.

After selecting a particular team member or group, the group routing controller 100 may operate the main transceiver 20 to selectively transmit the oral message to one or more wireless communication devices that correspond to the team member or group selected. For example, the group routing controller 100 may send a wireless signal to the main transceiver 20 that instructs the main transceiver to encrypt the outgoing oral message using a particular encryption code such that a recipient wireless communication device needs to decrypt the message before playing the oral message. In some embodiments, the group routing controller 100 may selectively transmit the message to a particular team member or group using other methods, for example, by sending the oral message using a particular frequency band, or using a particular frequency band in combination with encryption.

The group routing controller 100 may be configured to continue transmitting messages to the selected team member or group until a new team member or group is selected using the selection actuators 102. Furthermore, the group routing controller 100 may be configured so as to transmit messages to multiple team members or groups at the same time by depressing multiple selection actuators 102.

The selection actuators 102 may be pre-programmed, or may be user programmable, for example, by connecting the group routing controller 100 to an electronic computing device such as a personal computer or smart phone (e.g. via a USB port or wireless connection).

While the group routing controller 100 shown in the illustrated embodiment includes ten selection actuators 102, in other embodiments there may more be one or more selection actuators 102. While the group routing controller 100 may have any number of selection actuators 102, it may be desirable to limit the number of selection actuators 102, for example, to make the group routing controller 100 user friendly.

The group routing controller 100 may also include a display 104 for indicating the currently selected team member or group, and other parameters such as signal strength, volume, frequency, encryption code, hands-free on/off, power on/off light, one and two-way communication mode selection, and memory lock on/off.

The group routing controller 100 may also include additional controls 106 for adjusting volume, frequency, encryption code on/off, hands-free mode selection on/off, selection actuator memory lock, and the like.

In some embodiments, the group routing controller 100 may be worn on a team leader's arm or wrist using a mounting strap 108 and may be in wireless communication with the main transceiver 20, for example, using the first or second wireless protocol, or another wireless protocol. In other embodiments, the group routing controller 100 may be hardwired to the main transceiver 20, or may be integrated with the main transceiver 20. In yet other embodiments, the group routing controller 100 may be incorporated in another type of wireless communication device that does not include a main transceiver, such as the wireless communication device 14.

Figure 5:
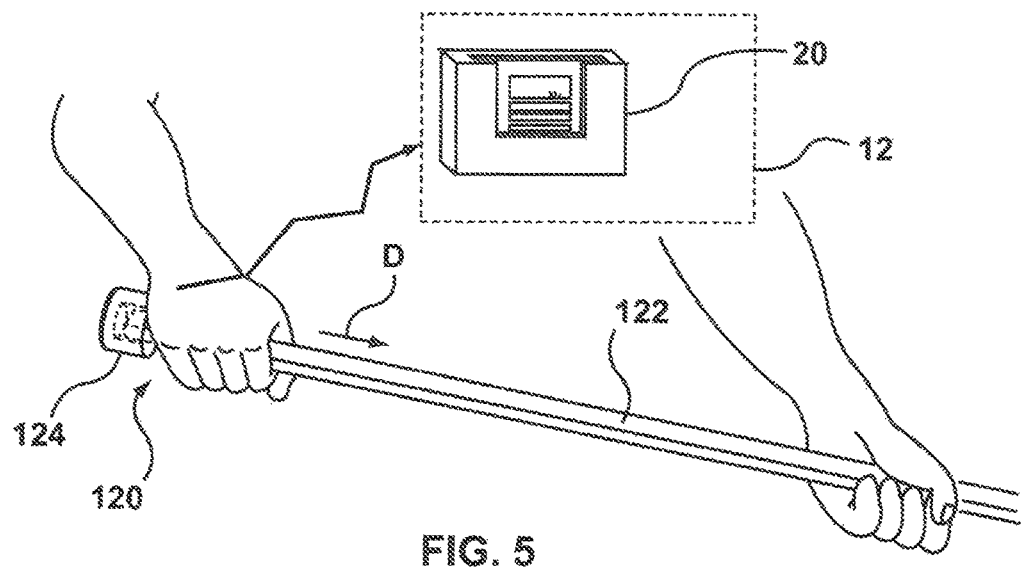
FIG. 5 is a perspective view of a stick trigger for hands-free operation of one of the wireless communication devices of FIG. 1.

Referring now to FIG. 5, illustrated therein is a stick trigger 120 for use with the wireless communication device 12 in embodiments for use with hockey teams. As shown, the stick trigger 120 is mounted to a hockey stick shaft 122 and is in communication with the main transceiver 20 such that actuating the stick trigger 120 enables transmission of the outgoing oral message. The stick trigger 120 allows "hands free" operation of the wireless communication device 12 such that the team member can operate the wireless communication device 12 with limited use of their hands, and in particular, such that the team member can hold a hockey stick while operating the wireless communication device 12.

In the illustrated embodiment, the stick trigger 120 includes a butt end trigger 124 mounted to a butt end of the hockey stick shaft 122. Pushing the butt end trigger 124 longitudinally inward relative to the shaft 122 (i.e. in the direction D) enables transmission of the outgoing oral message.

Figure 6:
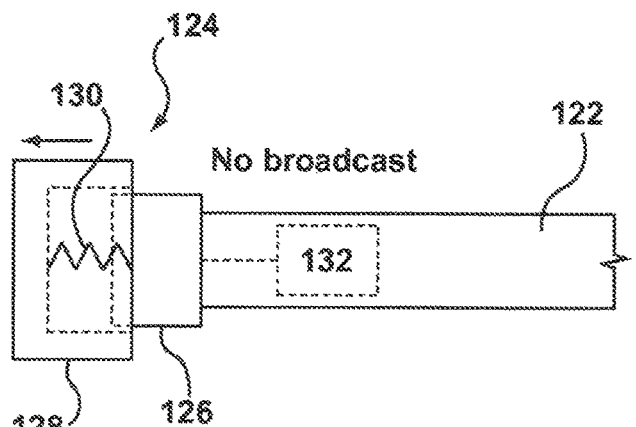
FIG. 6 is a side elevation view of the stick trigger of FIG. 5 in a deactivated position.
Figure 7:
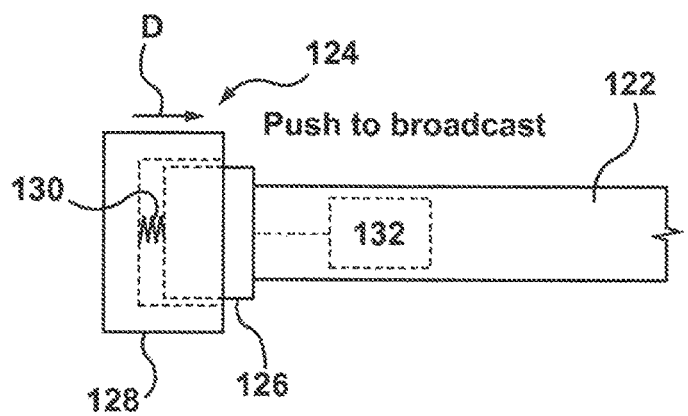
FIG. 7 is a side elevation view of the stick trigger of FIG. 5 in an activated position for transmitting outgoing oral messages using the wireless communication device.

Referring to the FIGS. 6 and 7, the butt end trigger 124 includes a ring shaped momentary push button mounted to the butt end of the shaft 122. The push button includes a base 126 and an actuator 128 slidably mounted to the base 126, for example, by providing the actuator 126 with a circular recess sized to receive the base 126. A spring 130 located between the base 126 and actuator 128 (e.g. within the recess) biases the actuator 128 toward a deactivated position as shown in FIG. 6.

The butt end trigger 124 also includes a wireless transducer 132 for communication with the main transceiver 20. The transducer 132 is connected to the push button such that pushing the actuator 128 inward along the direction D causes the wireless transducer 132 to send a signal to the main transceiver 20, which initiates transmission of the outgoing oral message.

When the team member pushes the actuator 128 inward, the spring 130 compresses between the base 126 and actuator 128. When the team member releases the actuator 128, the spring 130 automatically forces the actuator 128 back to the deactivated position and ends the transmission.

The base 126 and actuator 128 may be made of a durable material, such as rubber or another plastic, and may enclose components of the stick trigger 122 such as the wireless transducer 132 and other electronic components mounted to the butt end of the shaft 122.

The stick trigger 120 allows selective transmission of outgoing messages, which can reduce the amount of ambient noise transmitted to other team members, for example, by allowing the team member to transmit messages at particular times, as opposed to continuously transmitting all sounds. The stick trigger 120 also allows a team member (e.g. a puck carrier) to communicate with other team members (e.g. another player on the ice) while performing in-game manoeuvres (e.g. stick handling, shooting, and the like) without interrupting their focus or playing functionality.

Figure 8:
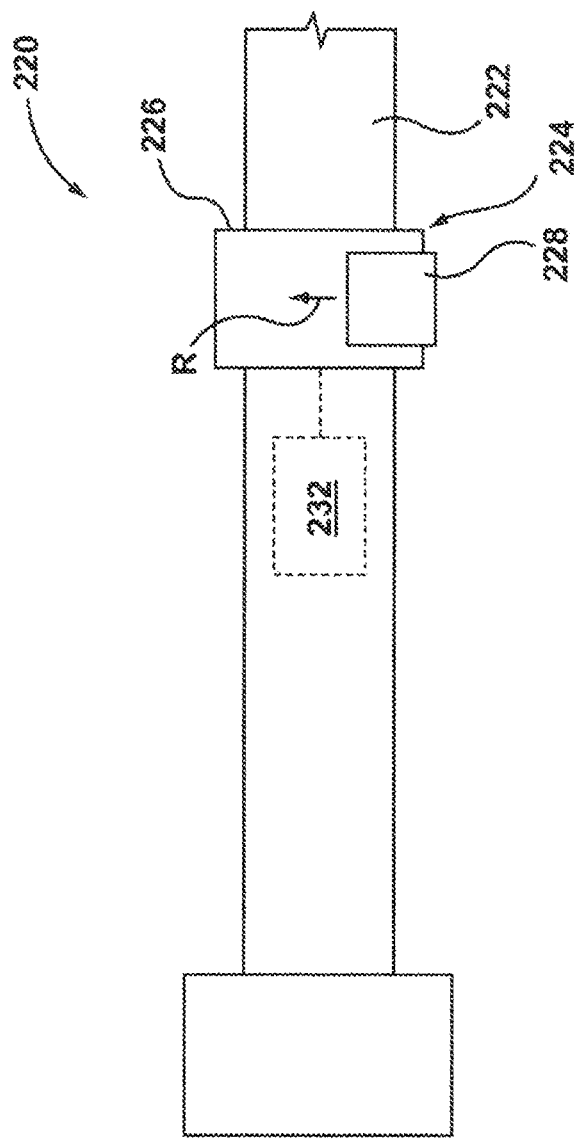
FIG. 8 is a side elevation view of another type of stick trigger for handsfree operation of one of the wireless communication devices of FIG. 1.
Figure 9:
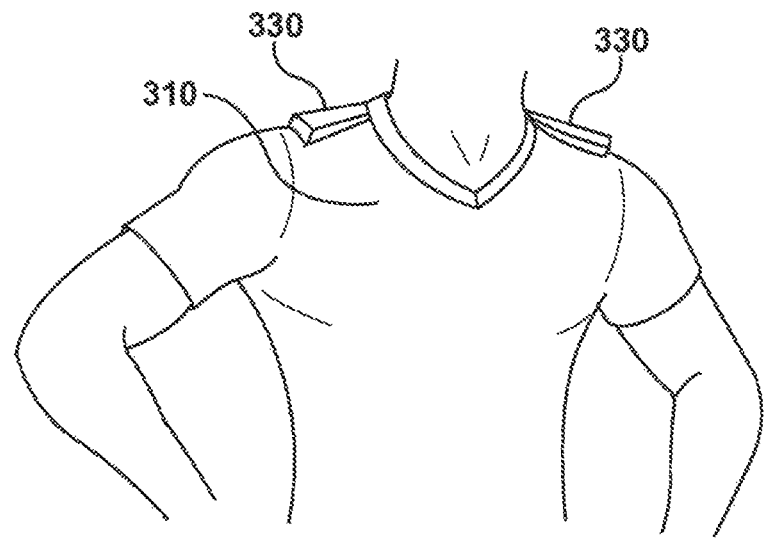
FIG. 9 is a perspective view of a shirt with two epaulet speakers for use with the wireless communication system of FIG. 1.

Referring to FIG. 8, illustrated therein is another type of stick trigger 220 for use with the wireless communication device 12.

The stick trigger 220 includes a push button 224 comprising a base 226 shaped as a ring mounted around the hockey stick shaft 222 and an actuator 228. The push button 224 is activated by pressing the actuator 228 radially inward along the direction R, which causes a wireless transducer 232 to send a signal to the main transceiver 20 so as to initiate transmission of an outgoing oral message.

As shown, the push button 224 is positioned on the stick shaft 222 so that a player can activate the push button 224 using their finger while holding the hockey stick. In particular, the push button 224 is spaced apart from the end of the stick shaft 222 by about 2-inches to 6-inches so that the user can activate the push button while holding the butt end of the hockey stick. In other embodiments, the push button 224 may be located further down the stick shaft 222 so that the player can depress the push button 224 with their other hand.

Referring now to FIGS. 9-12, there is a shirt 310 having two epaulet speakers 330 mounted to the shirt near the shoulders of a team member. The epaulet speakers 330 are another type of wearable audio device for use with the wireless communication system 10. In particular, the epaulette speakers 300 are generally used with the wireless communication device 12 and replace the headset 30 for generating audio corresponding to an incoming oral message. The epaulet speakers 330 can be used in sports that do not use a helmet such as soccer, baseball, track and field, and figure skating.

Figure 10:
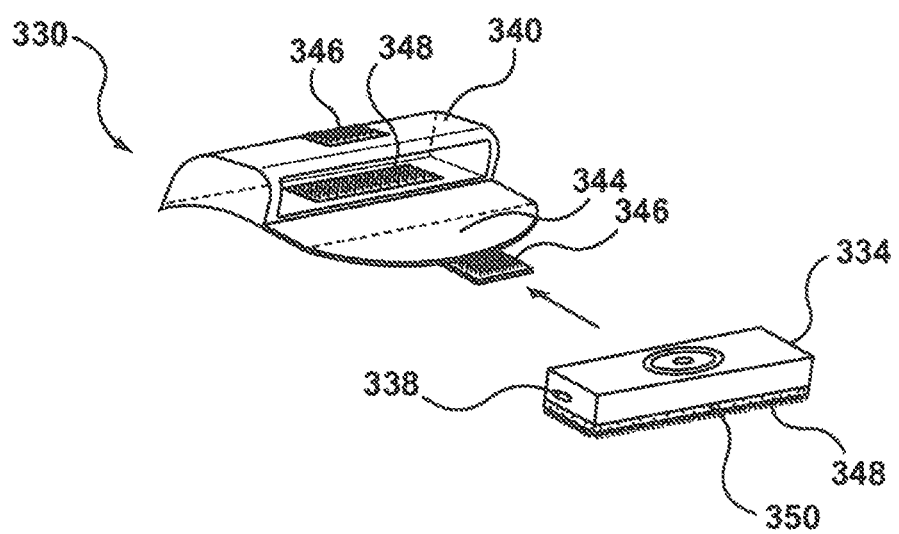
FIG. 10 is a partially exploded perspective view of one of the epaulet speakers of FIG. 9.

As shown in FIG. 10, each epaulet speaker 330 includes a speaker assembly 334 and an epaulet receptacle 340 for receiving the speaker assembly 334. The epaulet receptacle 340 is affixed to the shirt 310 near the shoulders of the team member, for example, by sewing a piece of fabric to the shirt 310 so as to form a pouch or pocket for receiving the speaker assembly 334. The epaulet receptacle 340 also includes a flap 344, which folds over to cover the pocket and retain the speaker assembly 334 within the epaulet receptacle 340.

Figure 11:
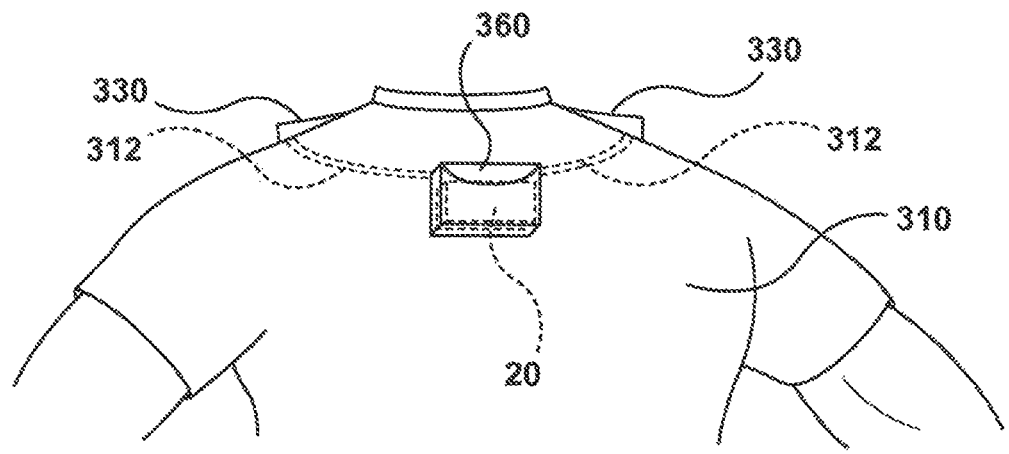
FIG. 11 is a perspective view of the shirt and epaulet speakers of FIG. 1 with the main transceiver mounted to the shirt using a containment receptacle.

The speaker assembly 334 is generally in communication with the main transceiver 20 so that the speaker assembly 334 can generate audio corresponding to an incoming oral message from another wireless device. For example, as shown in FIGS. 10 and 11, the speaker assembly 334 may include a speaker wire terminal 338 for connecting the speaker assembly 334 to the main transceiver 20 via a wire extending through wire conduits 312 in the shirt 310. In other embodiments, the speaker 334 may be in wireless communication with the main transceiver 20, for example, via a wireless receiver or transceiver as described previously with respect to the headset shown in FIG. 1.

Each epaulet speaker 330 also includes two fasteners for holding the speaker assembly 334 within the epaulet receptacle 340. In particular, there is a first fastener in the form of a first set of hook and loop fasteners 346 located on the flap 344 and the outer surface of the epaulet receptacle 340 for holding the flap 344 closed. There is also a second fastener in the form of a second set of hook and loop fasteners 348 located on the back of the speaker assembly 334 and on the interior surface of the epaulet receptacle 340 (i.e. within the pocket) for retaining the speaker assembly 334 within the epaulet receptacle 340. The combination of the first and second fasteners tends to provide redundancy so as to retain the speaker assembly 334 within the epaulet receptacle 340 even if one of the fasteners malfunctions or otherwise becomes unfastened.

In some embodiments, the epaulet receptacle 340 may be lined with a compressible material such as foam to provide comfort and shock absorption while minimizing interference to the mobility of the user. Furthermore, a foam pad 350 may be attached to the back of the speaker assembly 334 between the speaker assembly 334 and the hook and loop fasteners 348 to provide further shock absorption and comfort.

Figure 12:
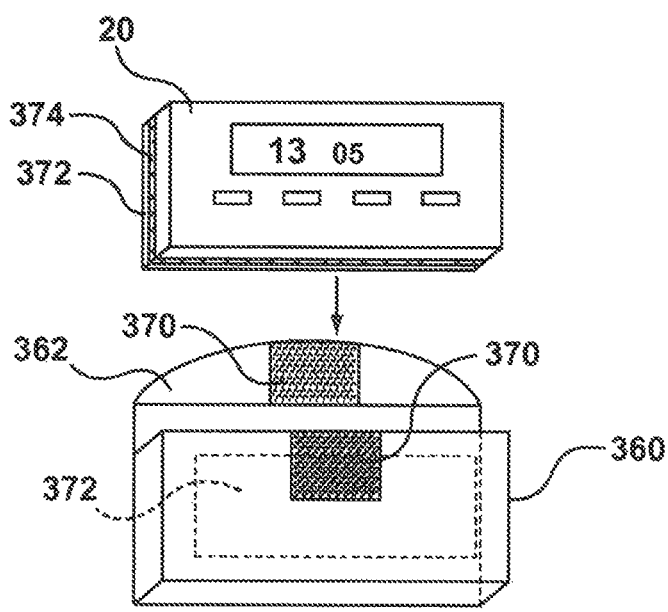
FIG. 12 is a partially exploded perspective view of the containment receptacle of FIG. 11.

Referring now to FIGS. 11 and 12, the main transceiver 20 is also mounted to the shirt 310 using a containment receptacle 360. The containment receptacle 360 is affixed to the shirt 310, for example, by stiches or the like. The receptacle 360 generally has a pocket for receiving the main transceiver 20 and a flap 362 that folds down to cover the pocket and retain the main transceiver 20 within the receptacle 360.

The receptacle 360 also includes two fasteners for retaining the main transceiver 20 within the pocket on the shirt 310. In particular, there is a first fastener in the form of a first set of hook and loop fasteners 370 located on the flap 362 and the outer surface of the receptacle 360 for holding the flap 362 closed. There is also a second fastener in the form of a second set of hook and loop fasteners 372 located on the back of the main transceiver 360 and on the interior surface of the receptacle 360 (i.e. within the pocket) for retaining the main transceiver 20 within the receptacle 360.

As shown in FIG. 11, the receptacle 360 is located on the back of the shirt 310 just below the neck of the team member. This location tends to provide comfort while minimizing interference to the mobility of the user, which may be particularly desirable when participating in athletic activities such as team sports. To provide further comfort, a foam pad 374 may be attached to the back of the main transceiver 20 between the hook and loop fasteners 374 and the main transceiver 20. In some embodiments, the entire outside surface of the main transceiver 20 may be covered in foam or another compressible material. Furthermore, the containment receptacle 360 may be lined with a similar compressible material.

Figure 13:
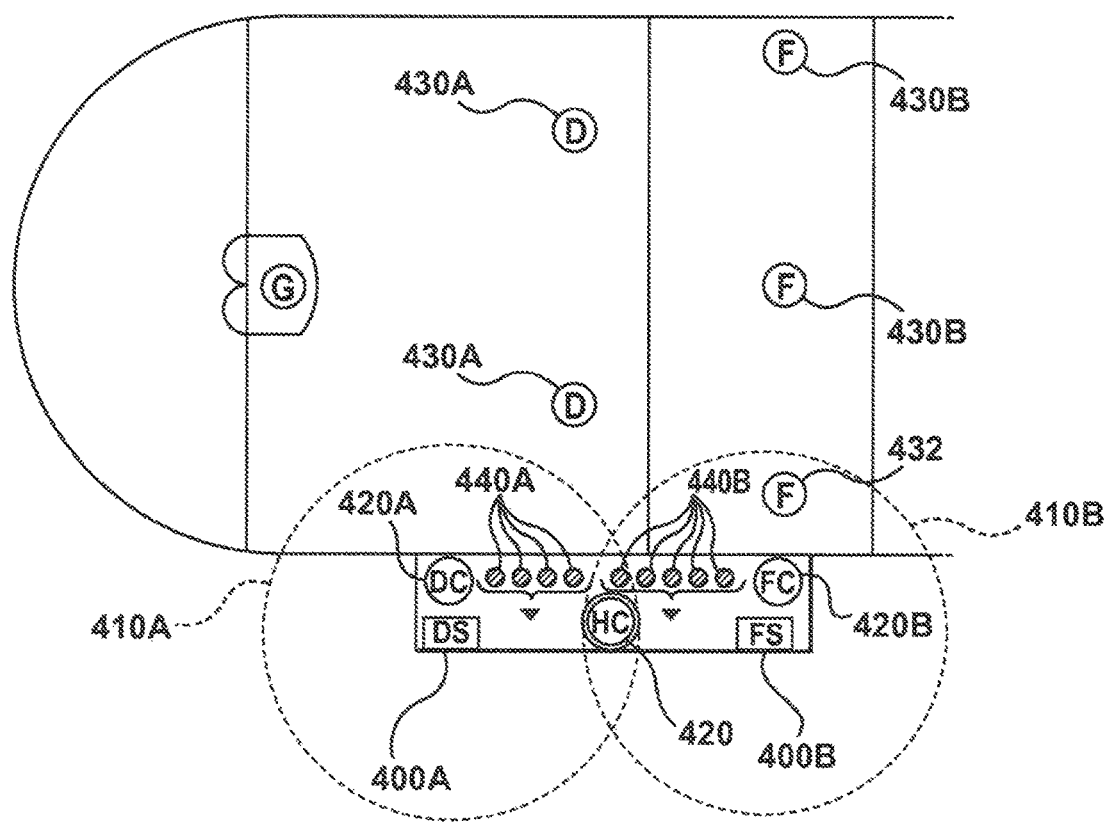
FIG. 13 is a schematic diagram of members of a wireless communication system that uses scanners to broadcast messages to team members that are located outside a detection area of the scanners.

Referring now to FIG. 13, the wireless communication system 10 may include one or more scanners 400A, 400B for detecting nearby team members. The scanners 400A, 400B can allow the wireless communication system 10 to automatically select which team members receive oral messages. For example, the wireless communication system 10 may broadcast messages only to team members that are located beyond the range of the scanners 400A, 400B. This allows a team leader such as a head coach 420 to send oral messages to active team members 430A, 430B currently located on a playing surface such as an ice rink, while other team members 440A, 440B on the bench do not receive the messages.

The scanners 400A, 400B may use any suitable device for detecting team members. For example, the scanners 400A, 400B may use radio-frequency identification (RFID) to detect RFID tags associated with each team member. The RFID tags may be integrated into the wireless communication device worn by each team member, or the RFID tags may be separately worn by each team member. While RFID technology has been described, the scanners could use infra-red scanners or another scanning device.

The scanners 400A, 400B are generally configured to detect team members within corresponding detection areas 410A, 410B. The wireless communication system 10 then uses information from the scanners 400A, 400B to selectively transmit messages to team members located outside the detection areas 410A, 410B and not team members located within the detection areas 410A, 410B.

For example, the wireless communication system 10 may define a broadcast group that initially includes all team members. The wireless communication system 10 may then receive information from the scanners 400A, 400B (e.g. via wired or wireless communication) in order to update the broadcast group by removing team members located within the detection areas 410A, 410B. Messages can then be sent to the remaining team members in the broadcast group.

In some embodiments, the wireless communication system 10 may also add players back to the broadcast group if they are not located within the detection areas 410A, 410B. Furthermore, the wireless communication system 10 may update the members of the broadcast group continuously or at regular intervals.

In an embodiment, the system includes a standby mode for selectively transmitting messages. Where a player's transceiver is within the detection area 410A, B, C (e.g. of FIG. 36) the player's transceiver enters a standby mode. In the standby mode, no signals are broadcast to the player's head set, the player's transceiver is idle, and the power level is reduced thereby saving power. Further, the amount and power of the radio signals that are transmitted may be reduced which may increase safety where the radio signals are harmful. For example, a player may spend a percentage (e.g. 67%) of the game on the bench, within the detection area 410A, B, C and the standby mode may reduce the power used. Once the player is out of the detection area 410A, B, C the player's transceiver is automatically turned back on and the player once again can send and receive broadcasts. In an embodiment, the stand-by mode is selectably activated on a controller (e.g. the coaches controller 740). In an embodiment, when the player is within the detection area 410A, B, C, the player is prevented from hearing the broadcast in their headsets.

In an embodiment, the system includes a low powered, short range (e.g. 20-30 feet) sub-signal (e.g. Bluetooth) that interrupts the transmission of the controller broadcast to the player's headset when the player's headset is in the detection area 410A, B, C. The sub-signal may prevent the player from receiving or sending messages.

Referring still to FIG. 13, the detection areas 410A, 410B may be sized and shaped to cover a particular area such as a team bench, a side-line, or an area near a coach.

In some embodiments, the detection areas 410A, 410B may have a short range. For example, the detection areas 410A, 410B may have a nominal size of less than about 10-meters, or more particularly, less than about 3-meters. This may reduce the chance of mistakenly detecting a player that is currently on the ice but near the bench. In the event that the system removes an active player near the bench (e.g. player 432), it is understood that such a player would still be able to hear instructions from the coach.

As shown in FIG. 13, there may be a first scanner 400A and a second scanner 400B. The first scanner 400A may be a defence scanner "DS" having a first detection area 410A for scanning defence players 440A on the bench, while the second scanner 400B may be a forward scanner "FS" having a second detection area 410B for scanning forward players 440B on the bench. While the illustrated embodiment includes two scanners 400A, 400B, in some embodiments, there may be one or more scanners.

In some embodiments, the wireless communication system 10 may be configured so that certain team leaders communicate with certain groups of team members. For example, with reference to the system shown in FIG. 13, the head coach 420 may communicate with all players on the ice 430A, 430B and all coaches 420A, 420B. At the same time, a defensive coach 420A may selectively communicate with only the defensive players 430A on the ice, and an offensive coach 420B may selectively communicate with only the offensive players 430B on the ice.

Figure 14:
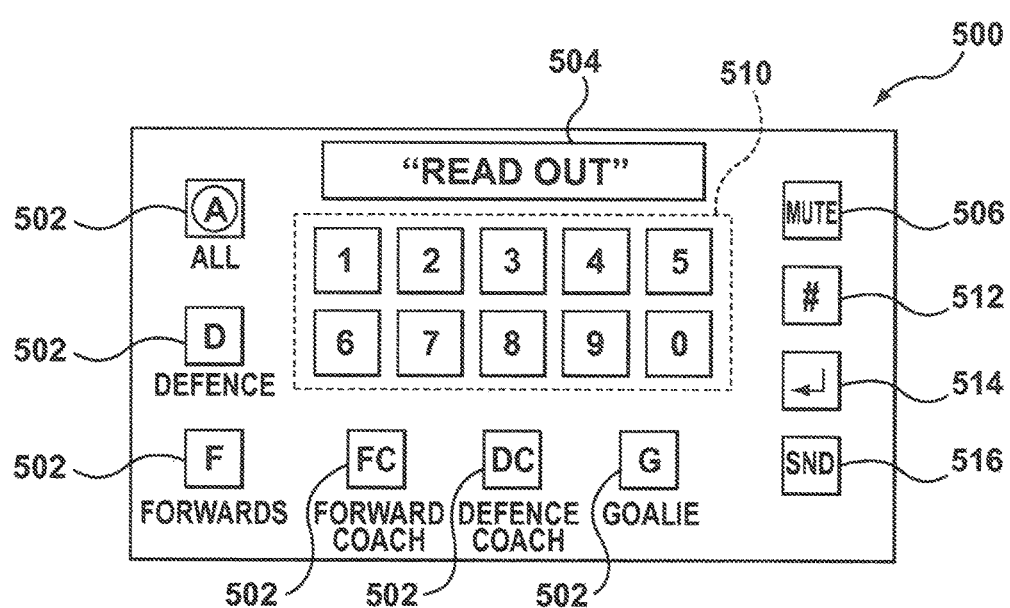
FIG. 14 is a front elevation view of a group routing controller for use with a wireless communication system.

Referring now to FIG. 14, illustrated therein is a group routing controller 500 according to another embodiment. The group routing controller 500 is similar in some respects to the group routing controller 100 and similar elements are given similar reference numerals incremented by four hundred. For example, the group routing controller 500 includes selection actuators 502 (e.g. for selecting groups such as "all", "defence", "forwards", or for selecting individuals such as a "forward coach", "defence coach" or "goalie"), a display 504, and additional controls 506 (e.g. a "mute" button).

The group routing controller 500 also includes a keypad 510 and additional selection actuators 512, 514, 516 for programming and customizing who receives broadcasted messages. As shown, the keypad 510 includes selection actuators in the form of numeric keys corresponding to numbers "0" to "9". The additional selection actuators 512, 514, 516 include keys labelled "#", "↵", and "SND" respectively. The function of these actuators will be described below.

The keypad 510 allows a user to individually send messages to a particular player by selecting their respective player number. Initially pressing the "#" actuator 512 indicates that a player is going to be selected by entering their player number using the keypad 510. Once the player number has been entered, pressing the "SND" actuator 516 completes the entry and allows messages to be sent to the selected player. For example, a coach may press the "#", "1", "6", "SND" in order to send messages to player number "16".

A user can also send messages to a customized group of team members. For example, initially pressing "↵" (actuator 514) indicates that a customized group is going to be selected using pre-programmed selection actuators or using player numbers. For example, pressing "↵", "F", "FC", "#", "2", "3", "SND" may allow the user to send messages to the forwards "F", the forward coach "FC", and player number "23". Messages will continue being sent to the selected team member or group until a new selection is made.

Figure 15:
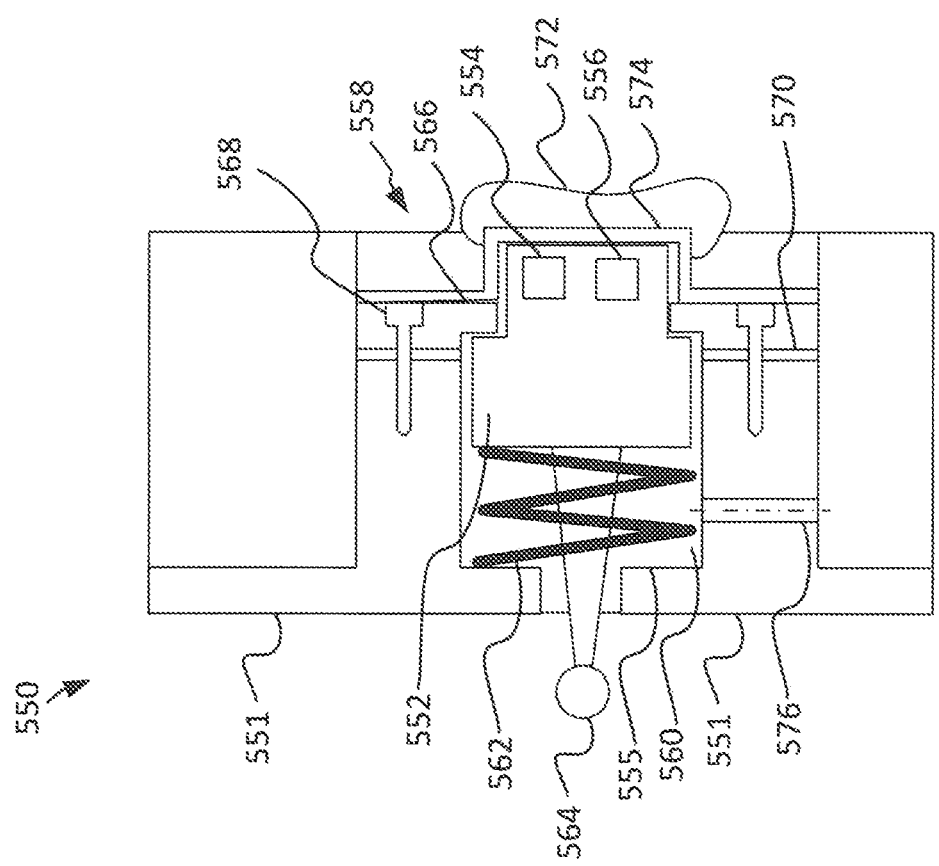
FIG. 15 is a section view of a helmet mounted communication system for use by members of a team, in accordance with an embodiment.

FIG. 15 illustrates a helmet 551 mounted communication system 550 for use by members of a team, in accordance with an embodiment. The helmet mounted communication system 550 (e.g. the wireless communication system 10) includes a headset 552 (e.g. headset 30) having any one or both of a speaker 554 for projecting audio and a microphone 556 for receiving audio. The helmet mounted communication system 550 includes a mounting structure 558 for mounting the headset 552 in a helmet cavity 560 of the helmet 551. The helmet cavity 560 is defined by a helmet cavity wall 555 in the helmet. The helmet mounted communication system 550 includes a biasing material 562 for floatably attaching the headset 552 in the helmet cavity wall 555. The biasing material 562 may be, for example, a spring or a resilient foam material. The biasing material 562 may compress more readily than the padding of the rest of the helmet 551 such that impact on the headset 552 area of the helmet 551 inhibits the headset 552 from being forced onto the user.

The biasing material 562 may allow the microphone 556 and speaker 554 to move into reasonably close proximity to the user once the helmet 551 is on the user's head and to allow the headset 552 to float smoothly in the helmet cavity 560. In the event of a collision, the headset 552 floats away from the user's face and head, reducing damage. The helmet mounted communication system 550 may allow the force of an impact to drive the headset 552 back into the helmet cavity 560, and prevent the forces being transferred from the hit, to the headset, to the player, unlike a fixed mounting. The headset 552 allows the user to pull the helmet 551 onto the head, while the headset 552 floats out of the way without interfering with the installation. Once the helmet 551 is on, the headset 552 springs into position. In the case of the microphone 556, a jaw bone style microphone can be used that may reduce ambient signals.

The headset 552 includes an antenna 564 for receiving and/or transmitting audio signals. The antenna 564 may protrude through an opening in the helmet 551. The opening may improve signal strength in a low powered system. In an embodiment, the antenna 564 is accessible by an opening in the helmet 551.

The headset 552 may communicate with a remote transceiver (e.g. transceiver 20). Alternatively, the helmet mounted communication system 550 may further include a transceiver (e.g. transceiver 20).

In an embodiment, the headset 552 is a jaw bone headset (positioned near a jaw bone of the user) and has both the speaker 554 and the microphone 556. When in use, the headset 552 may be positioned between an ear and a mouth of a user. The mounting structure 558 includes a noise abatement shield 572 (e.g. of foam) that moves with the microphone 556 for inhibiting the transmission of ambient noise to the microphone 556.

The mounting structure 558 includes a slide cap cover 566 for overlapping the headset 552 to hold the headset 552 in the helmet cavity 560. The mounting structure 558 includes at least one fastener 568 for attaching the slide cap cover 566 to the helmet 551. The headset 552 may be installed and removed with fasteners 568 (e.g. two simple screws). The headset 552 may be securely affixed within the helmet 551 such that the headset 552 cannot move and create an imbalance or awkward feel that may distract the user. The mounting structure 558 includes a cap shielding plate 570 on the helmet for mating with the slide cap cover 566 and the fastener 568. The cap shielding plate 570 is made of a resilient and flexible material for cushioning the headset 552 with respect to the helmet 551. The helmet cavity wall 555 is lined with shielding (not shown) to inhibit the transmission of force to the helmet 551 on an impact, thus protecting the user.

In sports such as hockey, with extreme violence, a player can receive many hard blows to the head many times over, in a single game. Should a headset be improperly placed/mounted in a helmet, it could put a player at risk. For example, if the headset was not properly padded and installed, thus allowing it to protrude out past the padding, as the headset is compressed by the blow, the force of the impact would be magnified by the reduction in surface that makes contact with the player's body part.

The force generated by a 200 pound player skating at speeds up to approximately 20 MPH and contacting another player, or the boards, is generally spread safely across the surface area of the helmet and the area it comes into contact with on the player which may be typically spread over an area of 100 square inches or more. However, if, the padding inside the helmet starts to compress as it absorbs the impact safely, until the point at which the tiny surface area of the headset, affixed directly to the helmet is now the sole point of contact. For example, with a surface area of 4 square inches and if the force has been dissipated by the absorption of the helmet padding to 50% of the original impact, which would translate into 12½ times more force, all focused on a small area of the player's head. This force will most likely act on the jaw, or the ear of the player, two very susceptible and vulnerable areas.

The helmet 551 may include a drain hole 576 or vent to allow moisture to exit the helmet cavity 560.

The headset 552 may also be easily accessed within the helmet 551 during a game. The helmet mounted communication system 550 may include a recharge port for providing power to the headset 552. The recharge port may allow recharging of the headset 552 without removal of the headset 552 from the helmet 551. The headset 552 may be recharged and/or programmed without being removed from the helmet 551 by means of a connecting cable.

The helmet mounted communication system 550 may include an aftermarket cartridge such that the headset 552 may be retrofitted into an existing helmet 501. In an embodiment the headset 552 is integrally formed with the helmet 551.

The helmet mounted communication system 550 may be used for hockey, football, or lacrosse. The helmet mounted communication system 550 includes a containment shield 574 for containing pieces the headset 552 when the headset 552 is destroyed from an impact. When used in heavy contact sports, damage may occur to the headset 552 and the containment shield 574 may prevent contamination off the playing surface (e.g. ice) by the damaged headset debris. The containment shield 574 may be made of a mesh material. The containment shield 574 may be particularly advantageous for hockey played on an ice rink. For example, where pieces of the damaged headset 552 spill, even in small amounts, on the ice, and a player were to step on while skating could result in a serious injury to the player, or other players, should the player fall and slide, out of control, at high speeds. The headset 552 may be waterproof.

FIGS. 16-23 illustrate helmets 600 having a headset for use by members of a team, in accordance with an embodiment. The helmet 600 may be for protecting a user's head having a hard outer shell and helmet padding 602. FIGS. 24-34B illustrate headsets for use in the helmet 600, in accordance with an embodiment.

Figure 16:
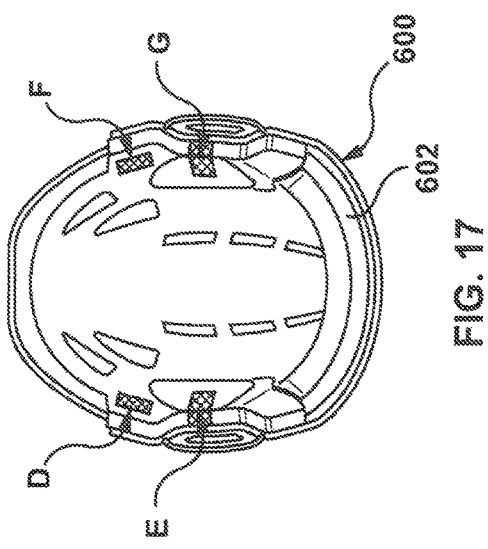
FIGS. 16 and 17 are a side section view and a bottom view, respectively, of a helmet showing headset mounting locations, in accordance with an embodiment.
Figure 17:
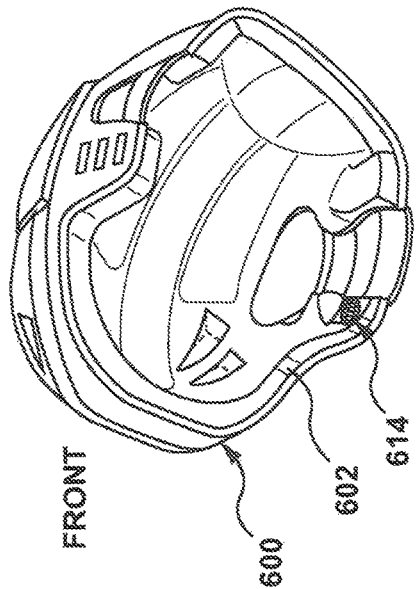

FIGS. 16 and 17 illustrate mounting locations for a headset (e.g. headset 552 of FIG. 15). The mounting locations include a front mounting position A, an ear side mounting position B, and an above ear mounting position C. The mounting locations of FIG. 17 include a front right mounting position D, an above right ear mounting position E, a front left mounting position F, and an above left ear mounting position G.

Figure 18:
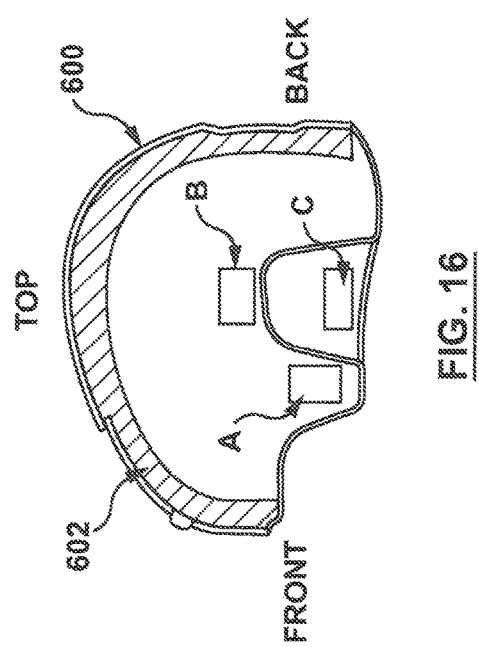
FIG. 18 is a bottom perspective view of a wireless speaker headset mounted in a helmet, in accordance with an embodiment.

FIG. 18 illustrates a helmet 600 having a wireless speaker headset 610 (of FIGS. 26A and 26B) mounted therein. The wireless speaker headset 610 communicates with a player's transceiver to receive a signal from the coach's transceiver. The wireless speaker headset 610 may synchronize with the player's transceiver, a wireless microphone, or another wireless speaker. The wireless speaker headset 610 may be hardwired to run a passive speaker.

Figure 27A:
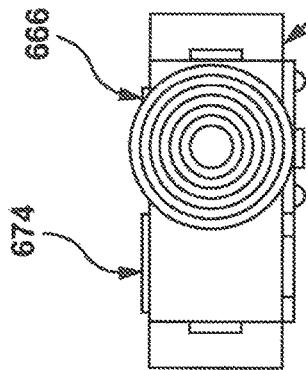
FIGS. 27A and 27B are top and side views of a wireless jaw bone microphone headset, in accordance with an embodiment.
Figure 27B:
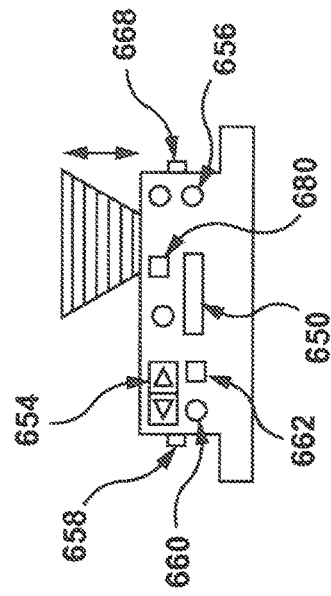

In an embodiment, the headset is a wireless microphone jaw bone headset 612 shown in FIGS. 27A and 27B. The wireless microphone jaw bone headset 612 communicates with the player's transceiver to send a signal to the coach's transceiver.

Figure 19:
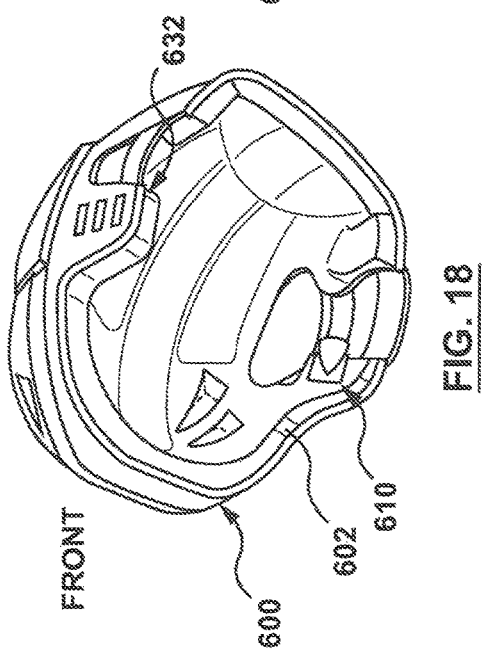
FIG. 19 is a bottom perspective view of a wireless microphone and speaker headset mounted in a helmet, in accordance with an embodiment.

FIG. 19 illustrates helmet 600 having a wireless boom style microphone headset 614. The wireless boom style microphone headset 614 communicates with the player's transceiver to send a signals to the coach's transceiver.

Figure 28A:
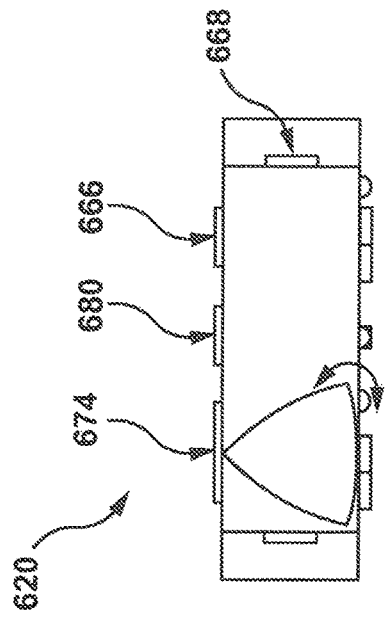
FIGS. 28A and 28B are top and side views of a jaw bone microphone and speaker headset, in accordance with an embodiment.
Figure 28B:
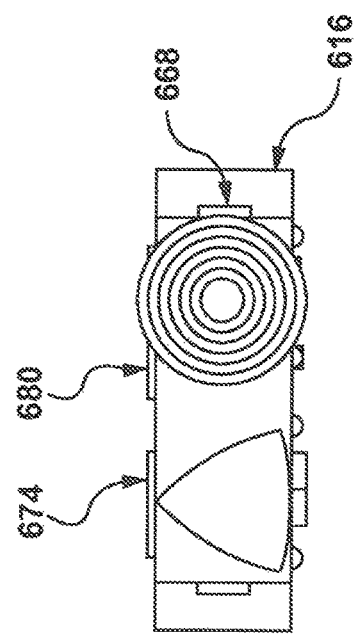
Figure 29A:
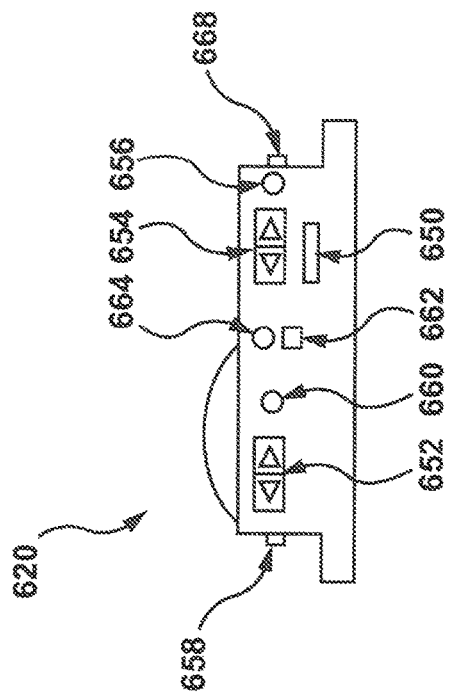
FIGS. 29A and 29B are top and side views of a transceiver and speaker headset, in accordance with an embodiment.
Figure 29B:
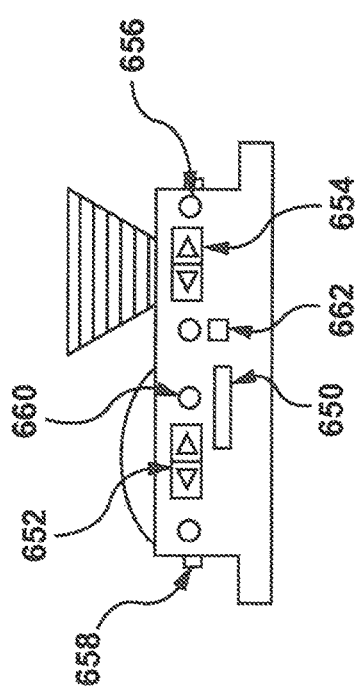

In an embodiment, the headset is a jaw bone style microphone and speaker headset 616 shown in FIGS. 28A and 28B. The jaw bone style microphone and speaker headset 616 may be hardwired to run a passive speaker.

Figure 20:
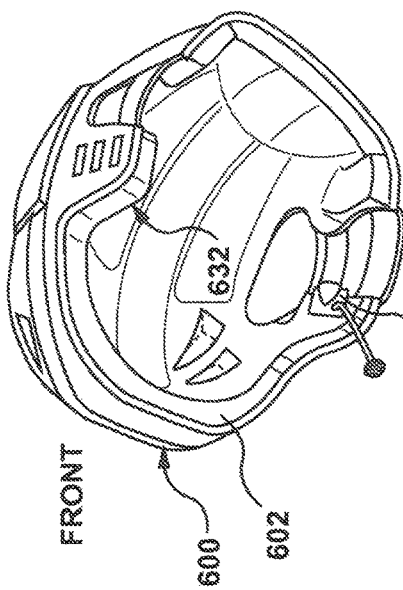
FIG. 20 is a bottom perspective view of a jaw bone microphone headset mounted in a helmet, in accordance with an embodiment.
Figure 21:
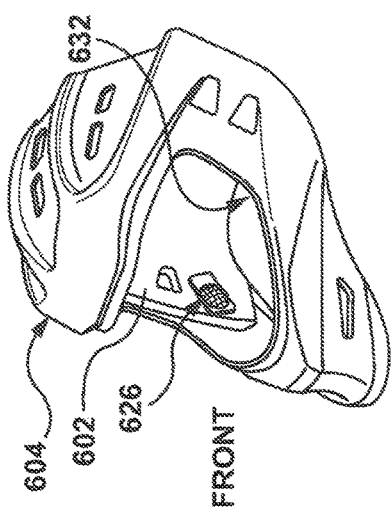
FIG. 21 is a bottom perspective view of a boom style microphone headset mounted in a helmet, in accordance with an embodiment.
Figure 31A:
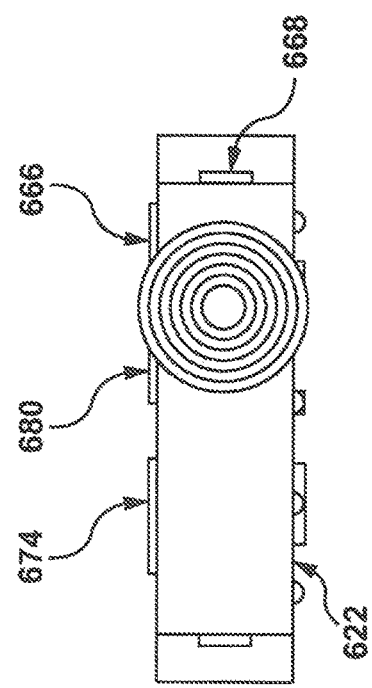
FIGS. 31A and 31B are top and side views of a transceiver, speaker, and jaw bone microphone headset, in accordance with an embodiment.
Figure 31B:
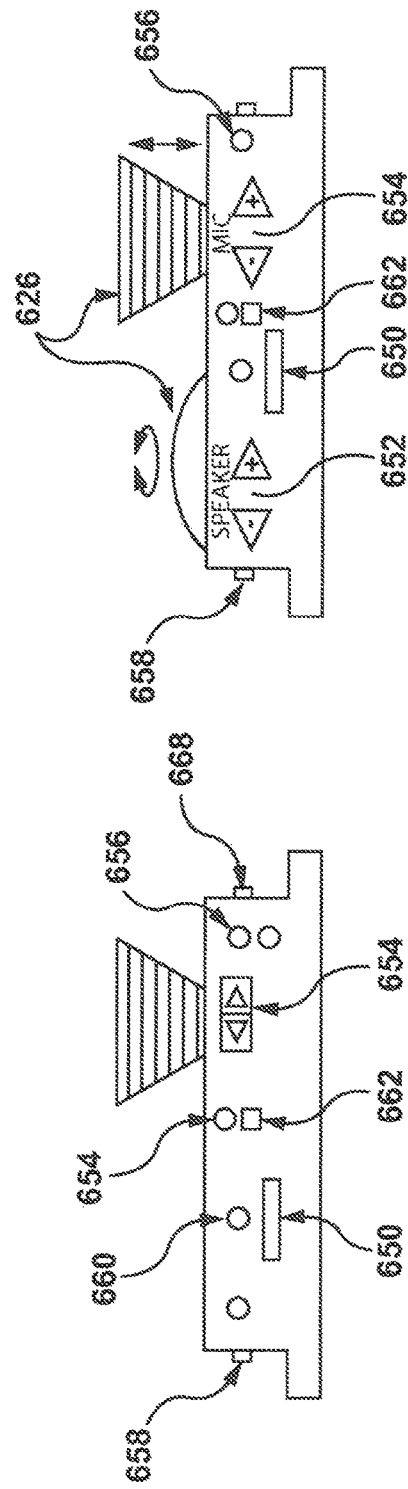
Figure 34A:
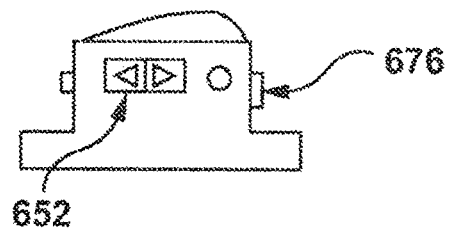
FIGS. 34A and 34B are top and side views of a passive speaker headset, in accordance with an embodiment.
Figure 34B:
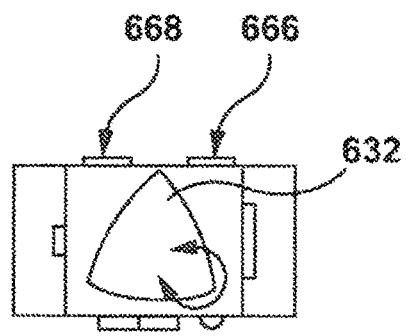

FIG. 20 illustrates a helmet 600 including a transceiver speaker headset 620 (of FIGS. 29A and 29B) and a jaw bone microphone headset 626 (of FIGS. 31A and 31B). FIG. 21 illustrates a helmet 600 including a transceiver speaker and boom style microphone headset 628 (of FIGS. 32A and 32B) and a passive speaker headset 632 (of FIGS. 34A and 34B). The headsets 626, 628 have a built in transceiver (e.g. transceiver 20) and communicate directly with the coach's transceiver. The headsets 626, 628 may synchronize with any one or more of the headset components and may be hardwired to headset components. The headsets 626, 628 may not be connected to the player's transceiver.

Figure 22:
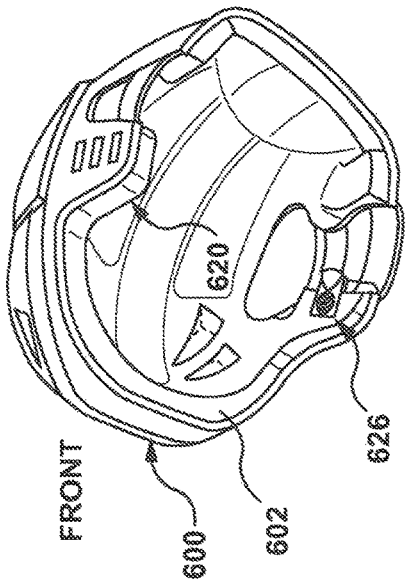
FIG. 22 is a bottom perspective view of a wireless speaker headset and a passive speaker microphone headset mounted in a helmet, in accordance with an embodiment.
Figure 23:
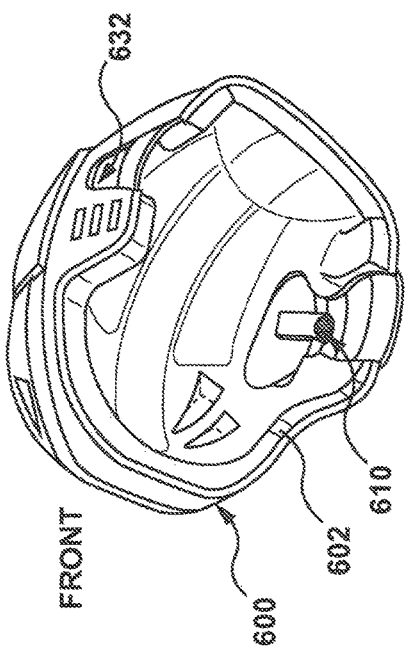
FIG. 23 is a side perspective view of a passive speaker microphone headset and a jaw bone microphone headset mounted in a helmet, in accordance with an embodiment.

FIG. 22 illustrates a helmet 600 having the wireless speaker headset 610 and the passive speaker headset 632. FIG. 23 illustrates a goalie mask 604 having the jaw bone microphone headset 626 and the passive speaker headset 632.

Figure 24:
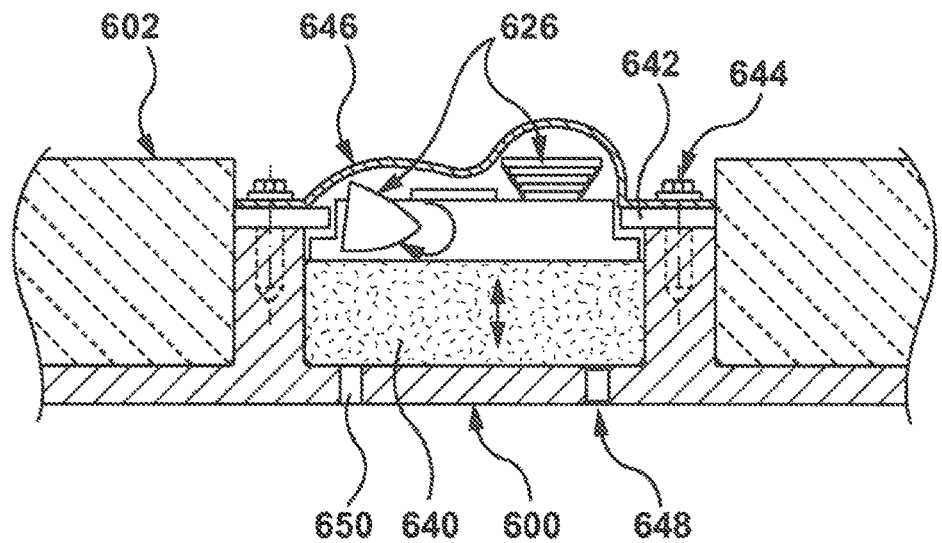
FIG. 24 is a section view of a jaw bone microphone and speaker headset mounted in a helmet, in accordance with an embodiment.
Figure 25:
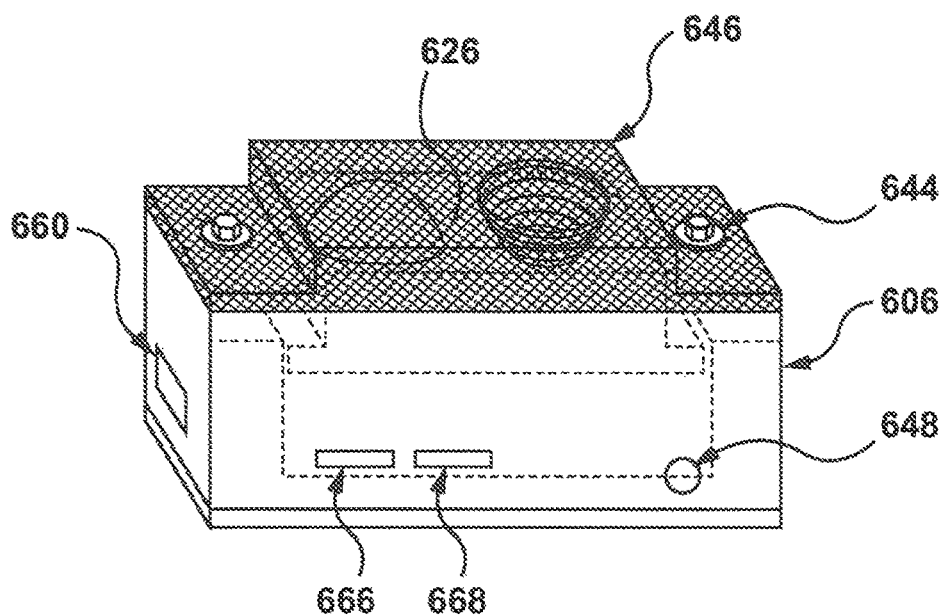
FIG. 25 is a perspective view of a jaw bone microphone and speaker headset cartridge, in accordance with an embodiment.
Figure 26A:
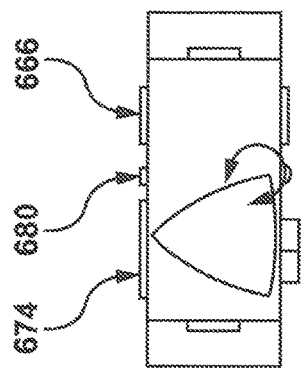
FIGS. 26A and 26B are top and side views of a wireless speaker headset, in accordance with an embodiment.
Figure 26B:
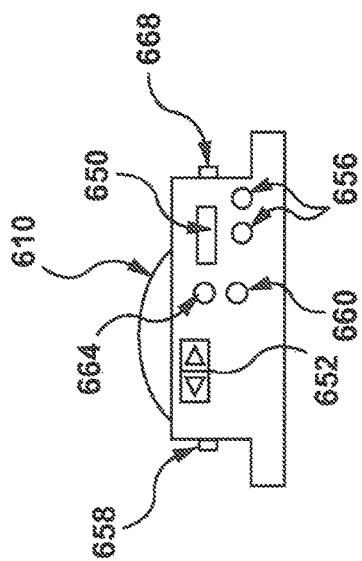

FIGS. 24 and 25 illustrate, respectively, an integral and a cartridge style headset 626 having a jaw bone microphone and a speaker.

Figure 30A:
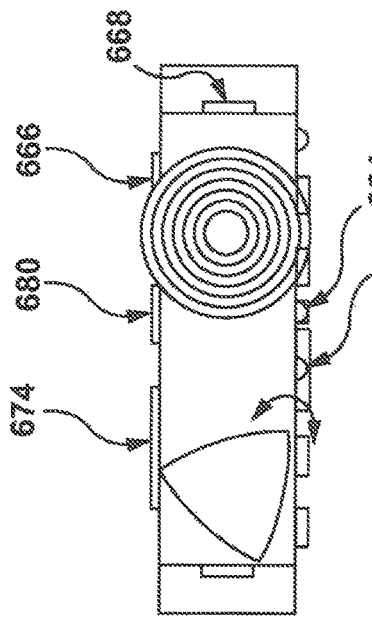
FIGS. 30A and 30B are top and side views of a transceiver and jaw bone microphone headset, in accordance with an embodiment.
Figure 30B:
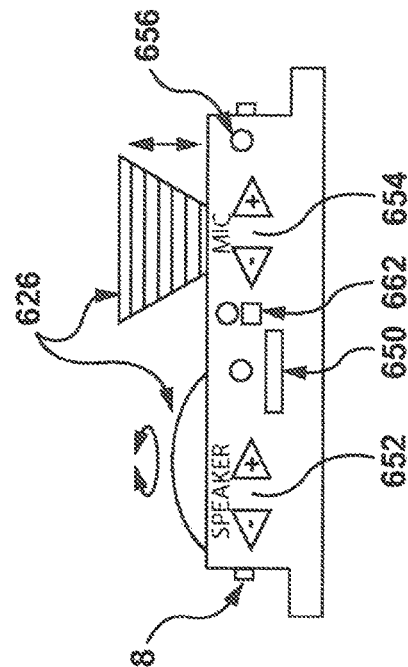

FIGS. 30A and 30B illustrate a transceiver and jaw bone microphone headset 322. FIGS. 33A and 33B illustrate a passive jaw bone microphone headset 630.

The headsets, as shown and as described above, may include any one or more of: a cartridge assembly block housing 606; a passive boom style microphone 634 which is hardwired to a wireless device to communicate; biasing material 640 used to allow the headset to float in the forward position and collapse in the event of a collision; slide cap covers 642; fasteners 644 such as cap screws and washers; a containment shield 646 which contains debris from reaching the playing surface (e.g. ice surface) in a catastrophic failure of the assembly; and a drain hole 648 for venting water to escape and allows the biasing material 640 to react quickly without the resistance of back pressure as the biasing material 640 compresses.

The headsets, as shown, may also include input and output devices such as any one or more of a power charging port 650 for removably connecting to a programming user interface such as a smart phone, computer, or a coaches controller (e.g. coaches controller 740); a speaker volume control 652; a microphone volume control 654; a sync key indicator 656; a power on/off switch 658; a power confirmation light 660; a microphone on/off switch 662; a microphone status light 664; a hardwire connection port 666 which can power a passive speaker or connect to a wireless device; a hardwire connection port 668 for powering a passive microphone or connection portal to a wireless device; an external connection port 670; an external connection port 672; a display screen 674; a passive speaker connection 676; and housing heat vents 678.

Due to the variety of existing helmet styles, this system includes different communication components variations to support existing helmet designs.

Figure 35:
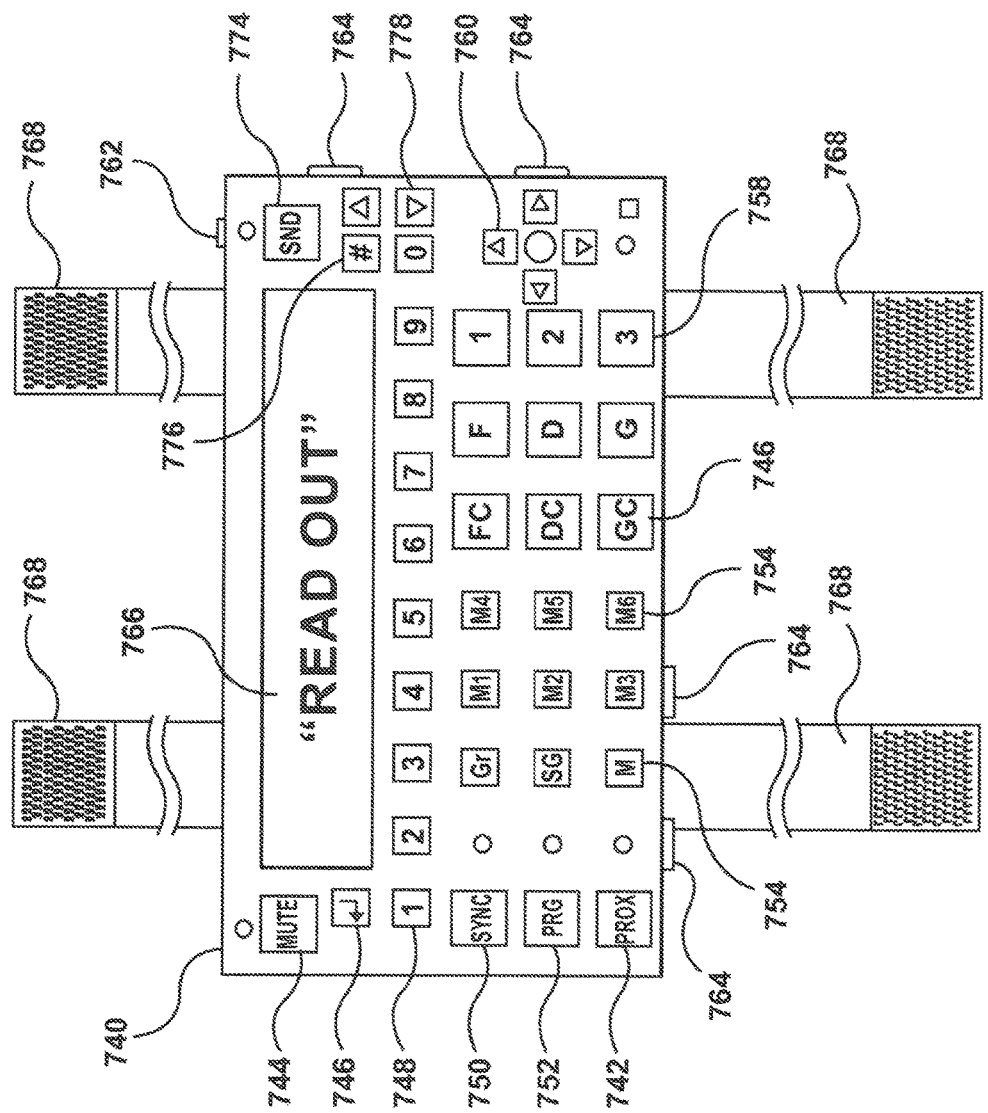
FIG. 35 is a front view of a coaches controller, in accordance with an embodiment.

FIG. 35 illustrates a coaches controller 740, in accordance with an embodiment (for example the group routing controller 100).

The coaches controller 740 may include a bench proximity sensor 742 (e.g. 400A, 400B) and a proximity sensor on/off control 752. As the coach may remain in the area of the bench during the game, it may be advantageous to have the proximately sensor integral with the coaches controller 740. In this embodiment, the controller may include a switch to allow the coach to switch the proximity feature on or off. Integrating the two units may reduce the costs, carrying and installation time, and damage to the proximity sensors. The integration may also reduce synchronizing the bench proximity sensors to the controller and the transceiver. The coaches controller may include an actuator for turning on and off the proximity cancellation/standby mode feature as desired.

In an embodiment, the coaches controller 740 may be integral with and communicate directly with the transceiver.

Figure 36:
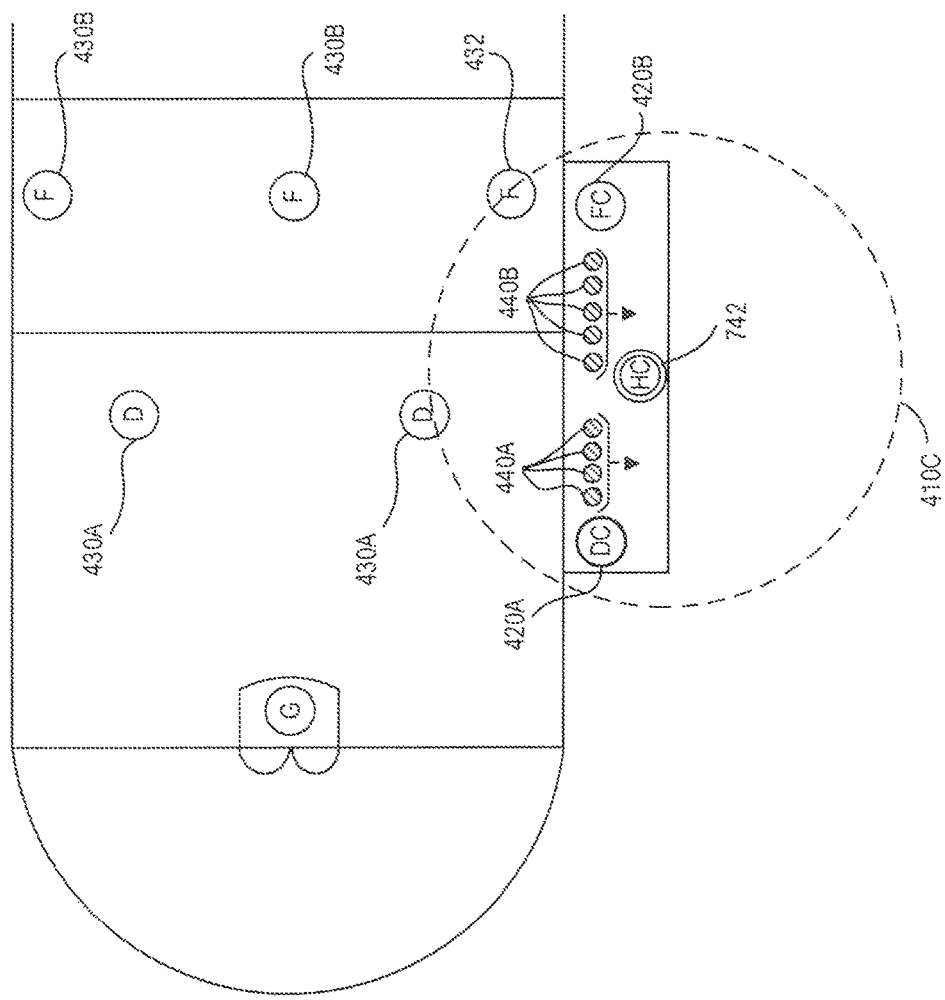
FIG. 36 is a schematic diagram of members of a wireless communication system that uses scanners to broadcast messages to team members that are located outside a detection area of the coaches controller having a proximity sensor, in accordance with an embodiment.

FIG. 36 illustrates the bench proximity sensor 742 mounted in the coaches controller 740, in accordance with an embodiment. The bench proximity sensor 742 is configured to detect team members within a detection area 410C (as similarly described with reference to FIG. 13).

Referring again to FIG. 35, the coaches controller 740 may also include a synchronization activation for pairing the coaches controller 740 with other group devices. The synchronization activation may use a wireless connection or a hardwire connection. In an embodiment, the coach's transceiver and the headset coordinate with players transceiver to perform a handshake protocol with the controllers and transceivers. The handshake signal may be either wireless or hardwired. This handshake may be performed using software on a personal computer, a smart phone, or the coaches controller 740. The connection between the devices may be similar to that of Bluetooth headset to a phone. It may use mac addressing, pre-signal broadcast signal messaging, or simple pairing protocols. Multiple devices may connect and perform dedicated communication functions simultaneously. The pairing of the controllers and transceivers may inhibit unauthorized eavesdropping on signal broadcasts, elimination of accidental cross talking generated by signal overlap, unauthorized sports equipment manufactures from supplying pads equipped with unlicensed devices.

The coaches controller 740 may include any one or more of a mute button 744; an enter button 746; number selection buttons 748 which may, once selected, stay illuminated until a new selection is made; a sync selection switch 750; and a sync confirmation light.

The coaches controller 740 may include any one or more of power on/off and status light 762; a USB connection and other interface ports 764; a display panel 766; mounting straps 768; shielding material 770; a wearing padding foam plate 772; a send button 774; a number key 776, and a volume control 778.

FIGS. 37A-37D illustrate a wireless and wired push to talk hand assembly 702, 700 in accordance with an embodiment. The push to talk hand assembly may simplify the coach's ability to communicate with group members. The coaches controller 740 may include a push to talk button 718. The push to talk button 718 is mated to a ring 720 for securing to a user's finger to position the push to talk assembly in the user's hand 722. The push to talk hand assembly 700, 702 may further include an on/off switch 704; a power on light 706; a sync key 708; and a sync status light 710.

Figure 37:
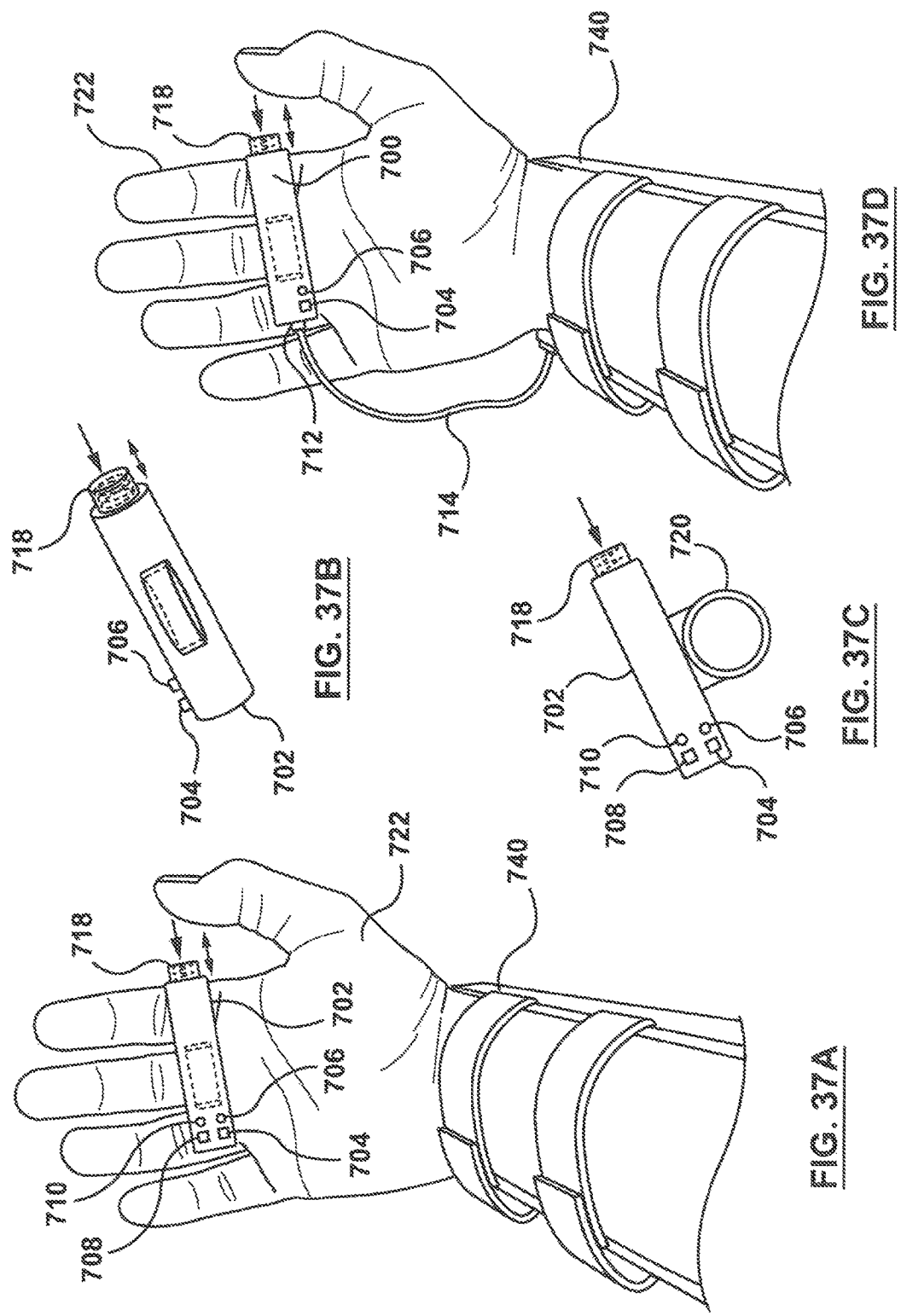
FIG. 37A is an in-use view of a wireless push to talk hand assembly, in accordance with an embodiment.
FIGS. 37B and 37C are top and side views of the wireless push to talk hand assembly of FIG. 37A.
FIG. 37D is an in-use view of a wired push to talk hand assembly, in accordance with an embodiment.

FIGS. 37A to 37C illustrate the wireless push to talk hand assembly 702 that communicates with the coach's transceiver. FIG. 37D illustrates wired talk hand assembly 700 including a hardwire connection port 712 and hardwire connection cable 714. The push to talk hand assembly 700, 702 may further include an on/off 704; a power on light 706; a sync key 708; and a sync status light 710.

Figure 38:
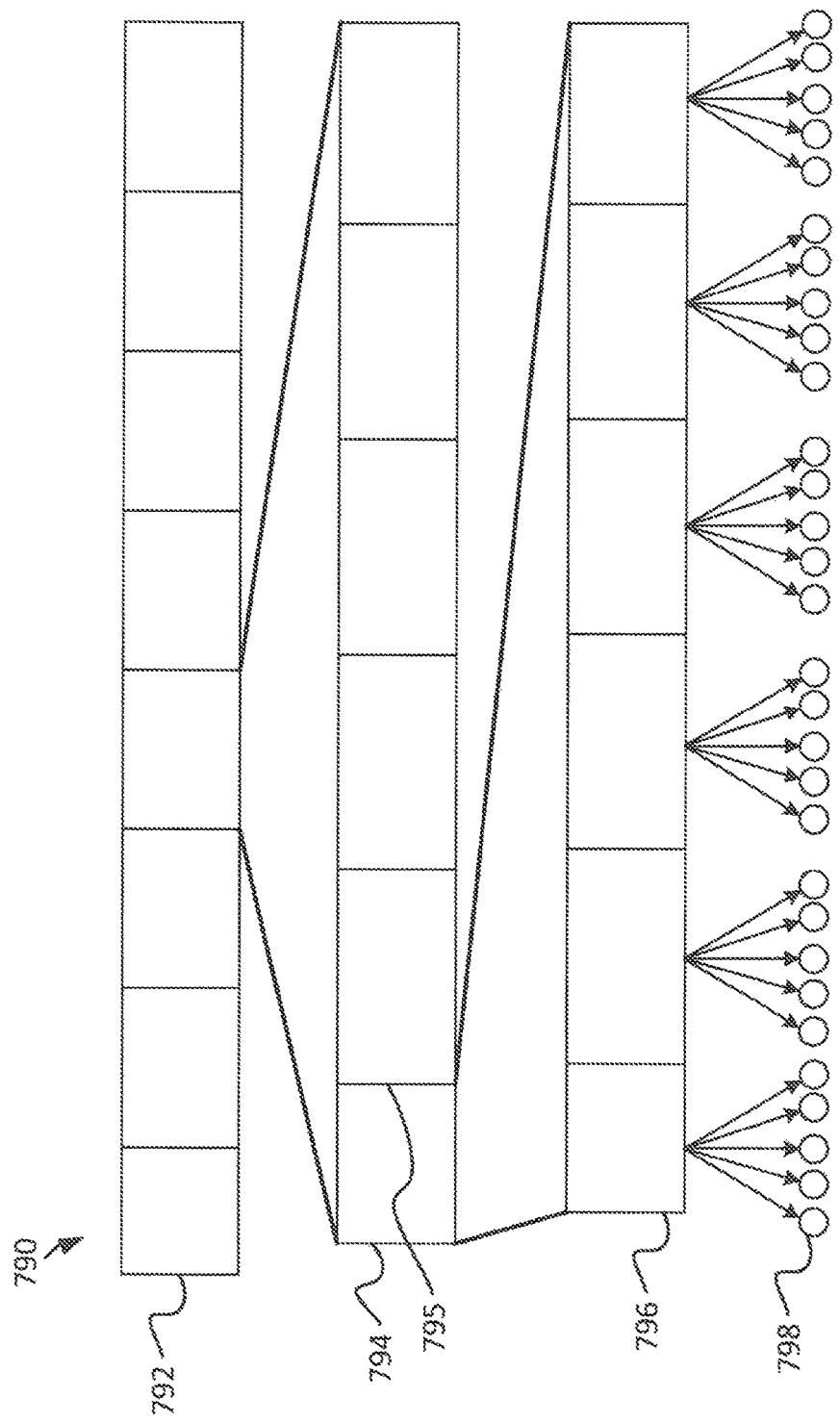
FIG. 38 is a diagram of a system for pre-set groups and subgroups, in accordance with an embodiment.

Referring again to FIG. 35, the coaches controller 740 may include pre-programmed group selection keys for pre-programmed group channels as described with respect to FIG. 38. The coaches controller 740 may include any one or more of group, sub-group and member selection keys 754; forward coach (FC), defence coach (DC), goalie coach (GC), forwards (F), defence (D), goalie (G) keys 756; pre-set keys 758 to select pre-programmed groups or sub-groups broadcasts such as first line, second line, or third line combinations; a cursor 760; and a select key/track ball mouse.

FIG. 38 illustrates a broadcast system 790 for pre-set groups and subgroups, in accordance with an embodiment. The broadcast system 790 may be manufactured with pre-set signal bandwidth settings. The broadcast system 790 includes a plurality of major bandwidths 792 (for example, from six to eight major bandwidths, or 1 to 20 major bandwidths). The major bandwidths 792 may include a group channel 794. The major bandwidths 792 are each are divided into a plurality of sub-group bands 796 (for example, from four to six sub-groups). Each of the sub-group bands 796 may be broadcast to an unlimited number of members 798. The selection of the group channels 794 and the sub-group band 796 for broadcasts is relayed to a transceiver via the controller (e.g. group routing controller 100).

The controller's display screen (for example the display panel 766 of FIG. 35) displays any one or more of the major bandwidths 792, group channels 794, the sub-group bands 796, and the names of the members 798 in each of the sub-group bands 796. The user may pre-program and use any number of group channels 794, the sub-group bands 796, and the names of the members 798 as available. In an embodiment, the controller can program and save the names of and the elements of the group channels 794, the sub-group bands 796, and the members 798 that are pre-programmed such that the group channels 794, the sub-group bands 796, and the members 798 can be called up for re-use automatically.

In an embodiment, the system will have any one or more of a tournament setting, a home game setting, an away game setting, and a practice setting. In the tournament setting, only one group channel 794 is used and its sub-group bands 796 and members 798 are assigned to the team. This will allow several other teams to use the group channel frequencies and limit the possibility cross talk or poor signal strength as a result of reduced head room. In the home game setting, two group channels 794 are used for each team, and the sub-group bands 796 and the members 798 of the teams are divided over the sub-group bands 796 associated with those two group channels 794. In the away game setting, two different group channels 795 and associated sub-group bands 796 are used with the same members 798 assigned in the same configuration as the home game set up. The controller uses a first group channel 794 for home games and a second group channel 795 for away games without reprogramming the controller for every game. In the practice setting, all of the group channels 795 and sub group bands 796 would be available to use with a reduced number (e.g. one or two) members 798 in each sub-group band 796. In the practice setting, the coach may communicate with players individually via the broadcast system 790.

The broadcast system 790 may allow for multiple teams to play simultaneously in a single facility with multiple playing arenas (e.g. ice rinks), without talking over each other (cross talking) and at the same time maintaining constant head room for the broadcasts.

In an embodiment, the controller communicates with an external broadcast system such as a television broadcast and a public address system. The external broadcast system can then rebroadcast the audio communication between the coaches and the players. For example, the external broadcast system may be any one or more of a pay-per-view feature on television, speakers built in the spectator seats at the arena, a phone app allowing the user watching the live game to listen in, and the like. In a further embodiment, the user selects a player and the user is provided audio of the communications to and from the selected player.

In an embodiment, the coach's transceiver and the controller each have their own dedicated and form fitting water proof mounting case, constructed of a soft, thick rubber case that allows for access to control functions, recharging and USB ports. The soft rubber may reduce the risk of injury and ice contamination from any unforeseen cause. In an embodiment, the coaches controller (e.g. 740) is in a case and strapped to the coach's wrist for ease of operation.

Figure 39:
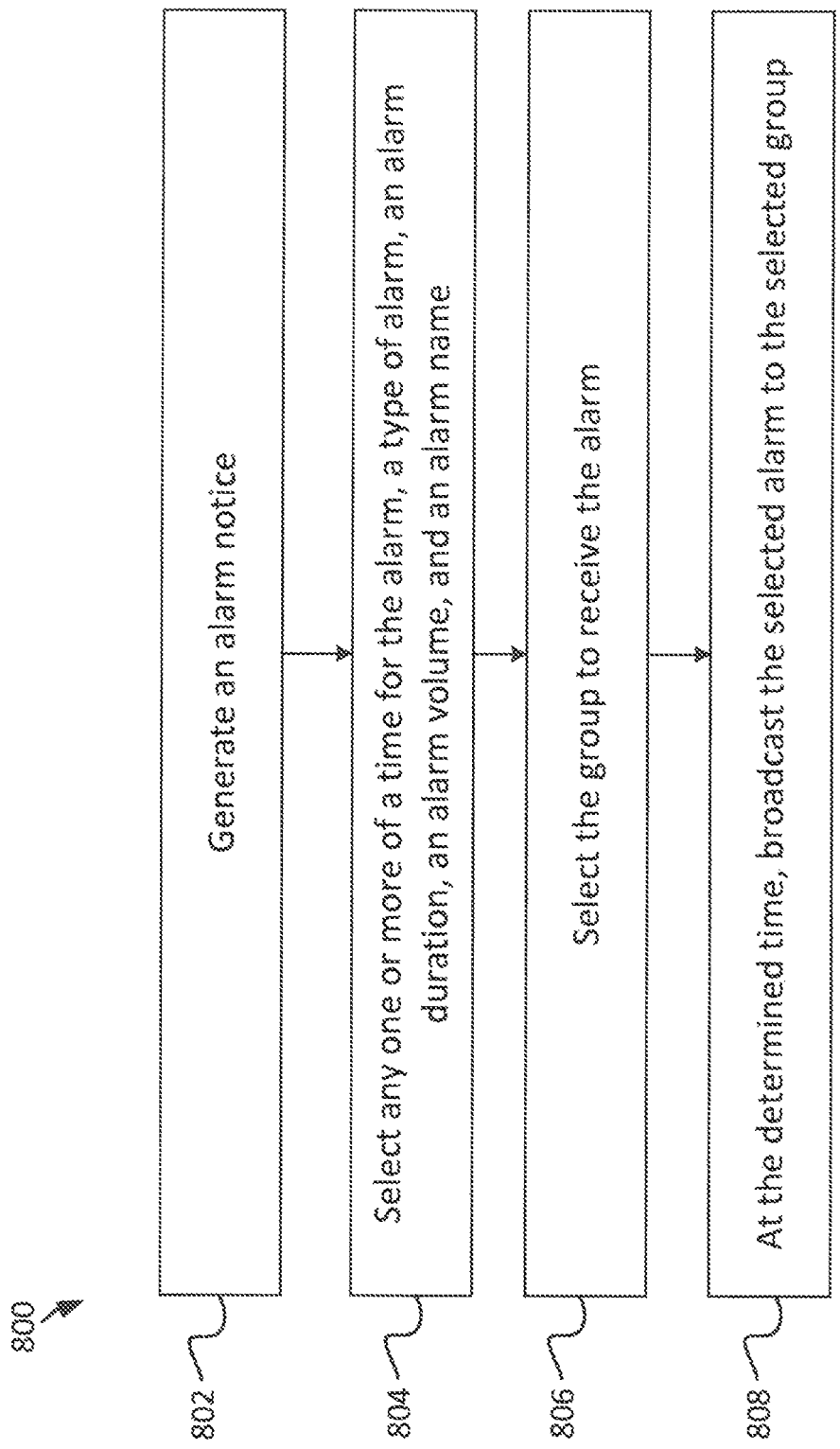
FIG. 39 is a flow chart of a method for warning, in accordance with an embodiment.
Figures 40, 41, 42:
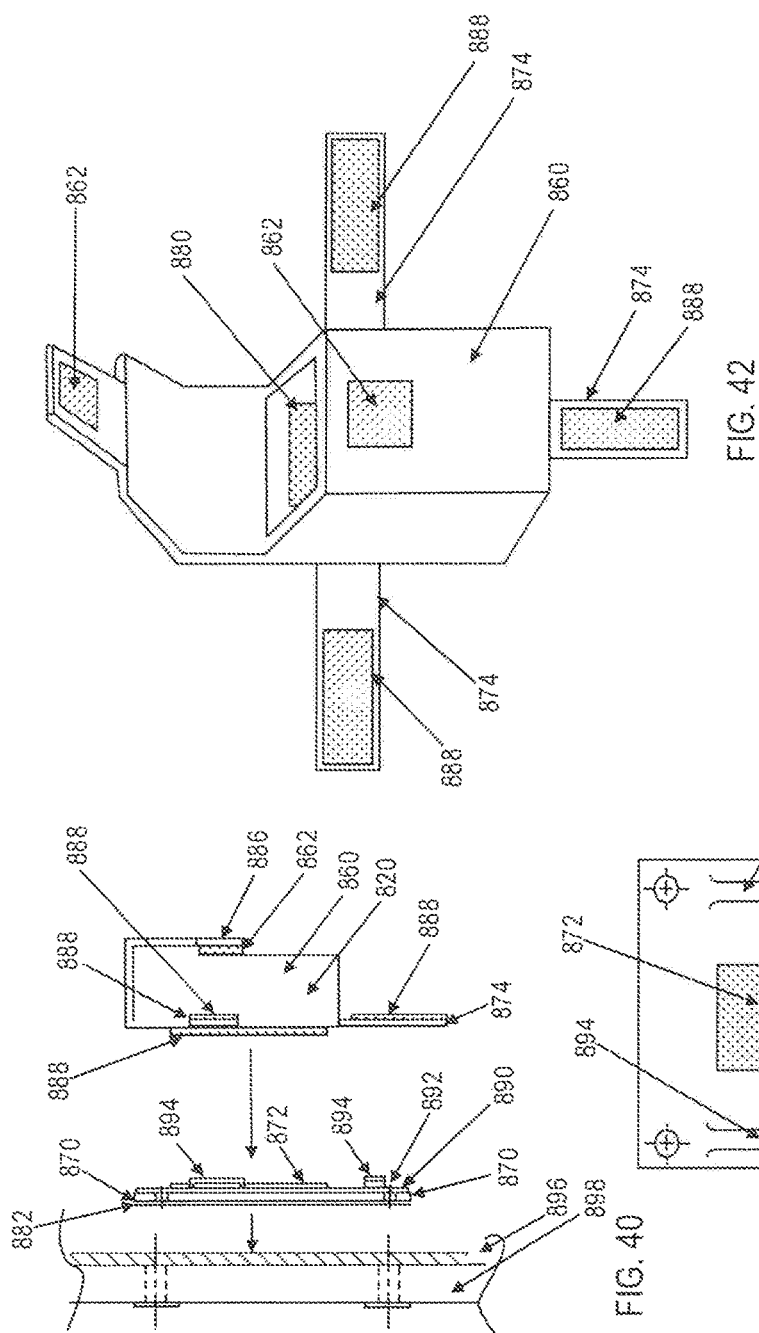
FIG. 40 is an exploded view of a shoulder pad mounted transceiver assembly, in accordance with an embodiment.
FIG. 41 is rear view of a mounting plate of the shoulder pad mounted transceiver assembly of FIG. 40.
FIG. 42 is a perspective view of a transceiver mounting skin of the shoulder pad mounted transceiver assembly of FIG. 40.
Figure 43:
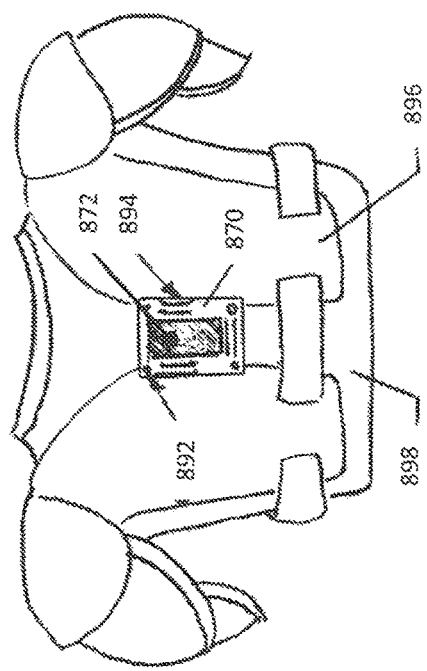
FIG. 43 is a rear view of shoulder pads having the mounting plate of FIG. 41 mounted thereon.
Figure 44:
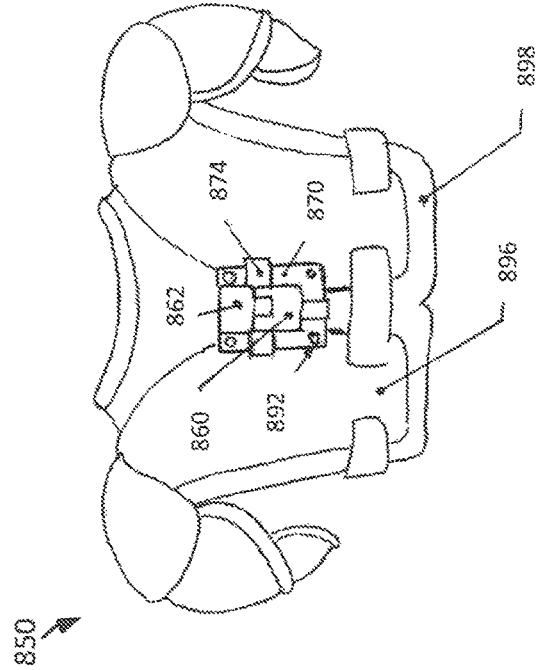
FIG. 44 is a rear view of the shoulder pad mounted transceiver assembly of FIG. 40.
Figure 48A:
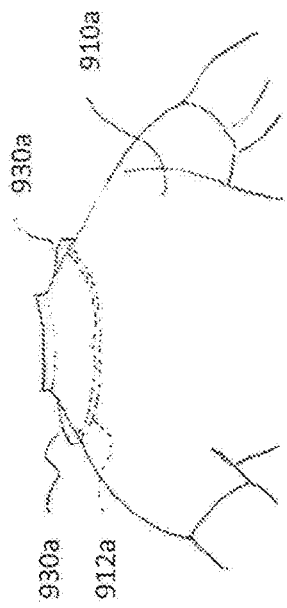
FIGS. 48A and 48B are rear and front in-use views of an epaulet system, in accordance with an embodiment.
Figure 48B:
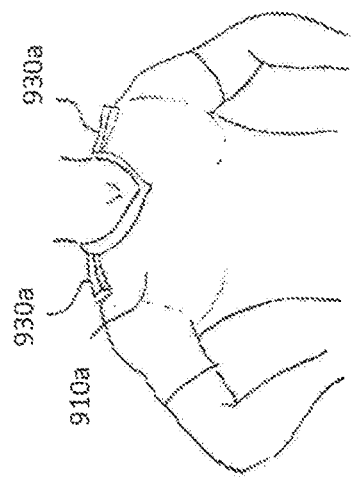
Figure 47:
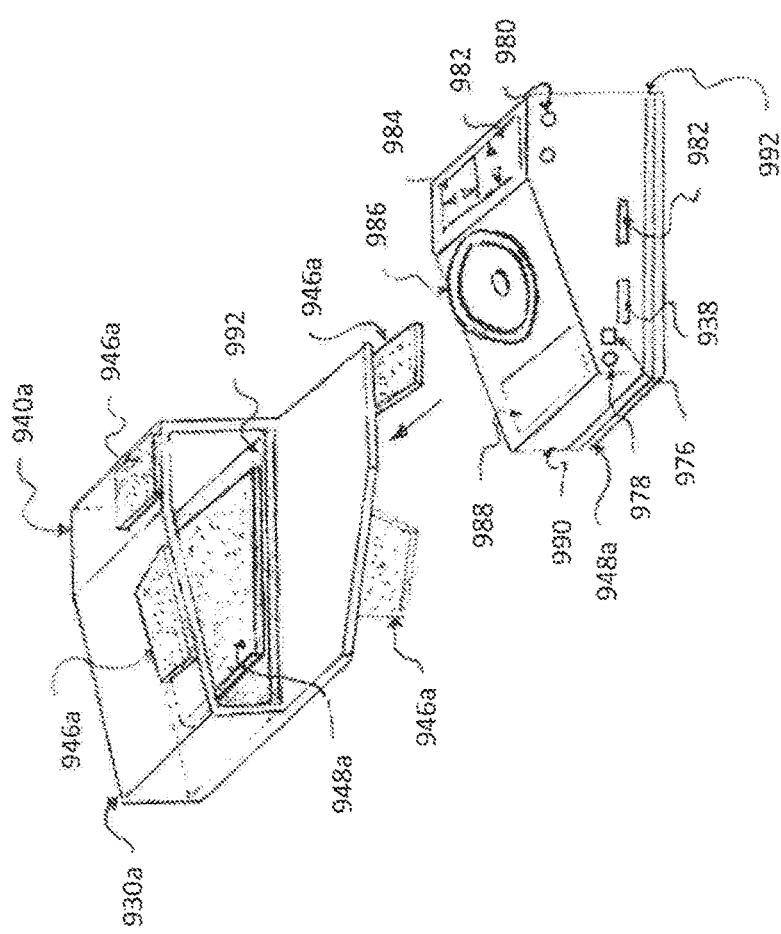
FIG. 47 is an exploded view of an epaulet mounting pouch and the epaulet transceiver of FIG. 46A.

FIG. 39 illustrates a method 800 for warning, in accordance with an embodiment. At 802, an alarm notice is generated (for example, by the coaches controller 740). The alarm notice may be either manually or automatically generated by an alarm module on the coaches controller 740 by means of a button or a pre-programmed timer located in the controller (e.g. coaches controller 740 or a PC/smart phone software app).

At 804, any one or more of a time for the alarm, a type of alarm (e.g. bell, ring, buzzer), an alarm duration, an alarm volume, and an alarm name is selected by the controller. At 806, the group to receive the alarm is selected. At 808, at the determined time, the controller will have the transceiver broadcast the selected alarm to the selected group.

The alarms may alleviate the problem of a coach getting caught up in the play and forgetting to watch the clock for line changes, end of penalties or last minute of the period. The timer settings duration, type and volume would be controlled by the controller.

FIGS. 40-44 illustrates a shoulder pad mounted transceiver assembly 850 (e.g. of FIG. 2), in accordance with an embodiment. The shoulder pad mounted transceiver assembly 850 includes a transceiver pouch 820 of a thick and soft polymer skin to provide a snug interference fit; hook and loop flap fasteners 862; a transceiver mounting plate 870; hook and loop fasteners 872 adding additional mounting security; a plurality (e.g. three) of transceiver mounting straps 874; an electrical shield layer 882; a transceiver mounting pouch flap 886; hook and loop fasteners 888 on the transceiver mounting straps 874; a high density foam pad 890; mounting plate mounting holes 892 for securing the transceiver mounting plate 870 to the shoulder pad plastic shell 896; mounting plate loops 884 for receiving the transceiver mounting straps 874; the shoulder pad plastic shell 896; and shoulder pad soft padding 898.

The shoulder pad mounted transceiver assembly 850 may immobilize the transceiver with respect to the wearer. The shoulder pad mounted transceiver assembly 850 holds the transceiver motionless, so as not to have an effect on the player's game. It may be uncomfortable and distracting for the player to feel the transceiver moving around on the their back as the player moves around the field of play (e.g. ice).

The shoulder pad mounted transceiver assembly 850 may be robust and securely fitted. The shoulder pad mounted transceiver assembly 850 may be contamination proof in the event of a high speed collision causing catastrophic damage to the transceiver. The shoulder pad mounted transceiver assembly 850 may be waterproof, shock proof, and light weight. The transceiver assembly 850 may include a containment shield. The shoulder pad mounted transceiver assembly 850 may support and protect the player wearing the transceiver, a second player making contact with the first player wearing the transceiver, as well as the transceiver and the ice surface from contamination. In addition, the shoulder pad mounted transceiver assembly 850 may provide access to the transceiver for recharging and reprogramming.

The shoulder pad mounted transceiver assembly 850 may be retrofitted onto shoulder pad plastic shell 896. The transceiver mounting plate 870 is affixed to the shoulder pad plastic shell 896 for example by rivets, screws, or sewn or glued or any combination thereof. The mounting plate 870 has loops 894 to accept the transceiver mounting straps 874. In addition, the patch of additional mounting security 872 in the centre of the transceiver mounting plate 870 corresponds to a patch of loop fasteners 888 on the transceiver mounting skin 860. The transceiver mounting straps 874 pass through the loops 894 on the transceiver mounting plate 870 and hold the transceiver mounting skin 860 tightly in three directions. The transceiver mounting skin 860 may be elastic and stretched (forced fit) to securely hug the form of the transceiver. The transceiver mounting skin 860 is water proof and is impact resistant. In an alternative embodiment, a manufacturer of new equipment may add mounting loops directly into the shoulder pads without the mounting plate 970 to mount the transceiver mounting skin 860.

FIGS. 45A-48B illustrate an epaulet system 900, in accordance with an embodiment. The epaulet system 900 may reduce movement, may have compact design, and may be built into an undergarment. The epaulet system 900 may include an epaulet transceiver 990.

The epaulet transceiver 990 may include any one or more of a hook and loop fastening layer 948, a high density foam padding layer 950, a power on/off 976, a power on status indicator light 978, a sync function key 980, a volume control 982, a panel view display control function key 984, a speaker assembly 986, a panel display 988, and an electromagnetic shield layer 992.

The epaulet system 900 may include an epaulet mounting pouch 940a, a redesigned shirt 910a, a wiring harness built into the shirt 912, a epaulet speaker 930 (e.g. as described with respect to FIGS. 9-12), hook and loop envelop skin fastening pads 946, and an epaulet 930a. In an embodiment, the epaulet speaker 930 is mounted onto sports equipment (e.g. shoulder pads).

The epaulet transceiver 930 may be wireless and communicate with the coaches controller, or the coach's transceiver as well as second speaker transceiver mounted on the players other shoulder. The tapered and angled design aims the epaulet speaker 930 towards the player's ear. Features include remote and hardwire programming, sync options to easily allow communication with other speaker transceivers, or the coach's transceiver, a display panel, volume controls, communication ports, electrical shielding, water and shock proof, aero movement during activities due to the robust mounting features that includes an interference fit mounting pouch combined with a hook and loop fastening system to provide additional holding force designed to ensure the epaulet system 900 is immobilized and stays in position.

In an embodiment, the epaulet mounting system 900 is built into an under jersey shirt or a team jersey and thus reducing the number of clothes worn by a player.

While some of the embodiments described herein relate specifically to wireless communication systems and components thereof for use in sports, the embodiments herein may also be used by other teams such as movie production teams, teams working in a doctor's office, live theatre teams, teams of employees in a retail store, and teams in other industrial or commercial applications.

While the above description provides examples of one or more apparatus, methods, or systems, it will be appreciated that other apparatus, methods, or systems may be within the scope of the present description as interpreted by one of skill in the art.

The invention claimed is:

1. A helmet mounted communication system for use by teams, the helmet mounted communication system comprising:
   a mounting structure for mounting the headset internally within a helmet cavity of a helmet having padding, the helmet cavity being a cavity in the padding, wherein the headset and mounting structure is positioned between a helmet wall and a user when the helmet is worn by a user; and
   a biasing material between the headset and a cavity wall of the helmet cavity and located next to the helmet wall, the biasing material floatably attaching the headset to the helmet in the helmet cavity so as to allow the headset to move within the cavity in the padding towards the user and wherein the biasing material compresses more readily than the padding, so that upon impact, the biasing material allows the headset to move within the helmet cavity, away from the user and towards the helmet wall.

2. The helmet mounted communication system of claim 1 wherein the headset includes an antenna for receiving or transmitting audio signals, wherein the antenna protrudes through an opening in the helmet.

3. The helmet mounted communication system of claim 1 wherein the mounting structure comprises:
   a slide cap cover for overlapping the headset to hold the headset in the helmet cavity;
   at least one fastener for attaching the slide cap cover to the helmet; and
   a cap shielding plate on the helmet for mating with the slide cap cover and the fastener and for cushioning the headset with respect to the helmet.

4. The helmet mounted communication system of claim 1 wherein the biasing material is a resilient foam or a spring that inhibits a transmission of an impact to the headset.

5. The helmet mounted communication system of claim 1 further comprising a containment shield for containing the headset when destroyed.

6. The helmet mounted communication system of claim 1 wherein the helmet mounted communication system is retrofitted into an existing helmet.

7. The helmet mounted communication system of claim 1, wherein the helmet cavity wall has a drain hole to allow moisture to exit the helmet cavity.

8. The helmet mounted communication system of claim 1 further comprising a recharge port for providing power to the headset.

9. The helmet mounted communication system of claim 1 wherein the headset includes a transceiver.

10. The helmet mounted communication system of claim 9, wherein the transceiver includes a proximity sensor configured to detect team members within a detection area.

11. The helmet mounted communication system of claim 1 wherein the headset communicates with a remote transceiver.

12. The helmet mounted communication system of claim 11, wherein the transceiver is immobilized in a shoulder pad mounted transceiver assembly.

13. The helmet mounted communication system of claim 1, wherein the headset includes both the speaker for projecting audio and the microphone for receiving audio.

14. The helmet mounted communication system of claim 13, wherein the wireless microphone is a jaw bone style microphone that reduces ambient signals.

15. The helmet mounted communication system of claim 13, wherein the mounting structure includes a noise abatement shield for inhibiting the transmission of ambient noise to the microphone.

16. The helmet mounted communication system of claim 13, wherein the microphone is a wireless boom style microphone headset that communicates with the transceiver to send signals to a coach's transceiver.

17. The helmet mounted communication system of claim 1, wherein the biasing material compresses more readily than padding of the helmet such that impact on the helmet inhibits the headset from being forced onto a user.

18. The helmet mounted communication system of claim 1, wherein the headset is positioned between an ear and a mouth of a user.

19. The helmet mounted communication system of claim 1, wherein the headset is mounted in the helmet in any one of a front position, an ear side position, an above ear position, a front right position, an above right ear position, a front left position, and an above left ear position.

20. The helmet mounted communication system of claim 1, wherein the biasing material allows the headset to float in a forward position and collapse in the event of a collision.

* * * * *